US011765292B2

(12) United States Patent
Miyamoto

(10) Patent No.: US 11,765,292 B2
(45) Date of Patent: Sep. 19, 2023

(54) INFORMATION PROCESSING APPARATUS USED FOR CONVERTING IMAGE TO FILE, IMAGE PROCESSING SYSTEM, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Daijiro Miyamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,669

(22) Filed: Dec. 2, 2021

(65) Prior Publication Data

US 2022/0182504 A1 Jun. 9, 2022

(30) Foreign Application Priority Data

Dec. 9, 2020 (JP) .................................. 2020-204414

(51) Int. Cl.
*H04N 1/00* (2006.01)
*G06V 30/412* (2022.01)

(52) U.S. Cl.
CPC ....... *H04N 1/00766* (2013.01); *G06V 30/412* (2022.01); *H04N 1/0044* (2013.01); *H04N 1/00331* (2013.01); *H04N 1/00848* (2013.01); *H04N 1/00941* (2013.01)

(58) Field of Classification Search
None
See application file for complete search history.

(56) References Cited

U.S. PATENT DOCUMENTS

| 8,139,870 | B2 | 3/2012 | Kato | |
| 11,128,767 | B2* | 9/2021 | Tsukada | ............. H04N 1/00217 |
| 11,301,675 | B2* | 4/2022 | Kato | .................... G06V 30/413 |
| 2002/0196479 | A1* | 12/2002 | Simske | ............. H04N 1/00795 |
| | | | | 358/527 |
| 2006/0050302 | A1* | 3/2006 | Sawaguchi | ............. G06F 16/51 |
| | | | | 358/1.15 |
| 2006/0143154 | A1* | 6/2006 | Jager | .................... G06V 30/416 |
| 2015/0373224 | A1* | 12/2015 | Kusakabe | .......... H04N 1/32128 |
| | | | | 358/1.15 |

(Continued)

FOREIGN PATENT DOCUMENTS

JP 2007233913 A 9/2007

*Primary Examiner* — Miya J Cato
(74) *Attorney, Agent, or Firm* — ROSSI, KIMMS & McDOWELL LLP

(57) ABSTRACT

An information processing apparatus capable of reducing troublesome work of a user when converting an image obtained by newly scanning a business form to a file. An information processing apparatus that sets, when converting the image to a file, a file name of the image. A preview image of the scanned original is displayed, and user selection of a character area on the preview image is detected. An item name candidate area is extracted based on location information of the character area selected by the user on the preview image, and a character string included in the item name candidate area is set as an item name of a character string included in the character area selected by the user. The set item name is displayed as a file name rule such that the set item name is selectable by the user.

10 Claims, 24 Drawing Sheets

(56) References Cited

U.S. PATENT DOCUMENTS

| | | | |
|---|---|---|---|
| 2016/0162481 A1* | 6/2016 | Fukasawa | G06F 16/164 |
| | | | 707/823 |
| 2018/0218206 A1* | 8/2018 | Kamata | H04N 1/32106 |
| 2019/0065451 A1* | 2/2019 | Miyamoto | G06V 30/414 |
| 2019/0065843 A1* | 2/2019 | Matsumoto | G06V 30/1456 |
| 2019/0197305 A1* | 6/2019 | Kanada | G06V 30/40 |
| 2020/0167589 A1* | 5/2020 | Kumahashi | H04N 1/00411 |
| 2021/0295033 A1* | 9/2021 | Takayama | G06F 16/93 |
| 2022/0292251 A1* | 9/2022 | Shiraishi | G06F 40/117 |

* cited by examiner

FIG. 14

| No | matched | formID | destination | folderPath | output Setting | fileRule | ocr1 | ocr2 | ocr3 | meta Data1 | meta Data2 | ... | meta DataN |
|---|---|---|---|---|---|---|---|---|---|---|---|---|---|
| 1 | TRUE | aaaaaaaa-ffff-49ab-acf8-5555888eeee | Cloud Service1 | /Quotation/Company A | PDF | [Quotation No.]_[Date]_[Time] | Quotation No.: R12-3456 | | | | | | |
| 2 | TRUE | bbbbbbb-gggg-23ab-acf4-23121111ffff | Cloud Service2 | home/0345/Drawing/2020 | TIFF | [User name]_[Date]_[Time] | | | | Suzuki | February 3, 2020 | | |
| 3 | FALSE | cccccc-hhhh-89ab-acf5-83719999gggg | | | | | | | | | | | |
| 4 | | | | | | | | | | | | | |
| 5 | | | | | | | | | | | | | |

FIG. 19A

NO SETTINGS-ASSOCIATED BUTTON

1910

| user | formID | destination | folderPath | output Setting | fileRule | file Region1 | ... | file Region3 | meta Data1 | meta Data2 | ... | meta Data5 |
|---|---|---|---|---|---|---|---|---|---|---|---|---|
| userA | aaaaaaaa-ffff-49ab-acf8-5558888eeee | Cloud Service1 | /Quotation/ Company A | PDF | [Quotation No.]_ [Date]_[Time] | [Quotation No.] (10,20,5,10) | ... | | (20,30,5,20) | | ... | |
| userA | bbbbbbbb-gggg-23ab-acf4-2312111ffff | Cloud Service2 | home/0345/ Drawing/2020 | TIFF | [User name]_ [Date]_[Time] | | ... | | (20,30,5,20) | February 3, 2020 | ... | |
| | cccccccc-hhhh-89ab-acf5-8371999ggggg | | | | | | ... | | | | ... | |

FIG. 19B

SETTINGS-ASSOCIATED BUTTON

1920

| buttonID | formID | destination | folderPath | output Setting | fileRule | fileRegion1 | ... | file Region3 | meta Data1 | meta Data2 | ... | meta Data5 |
|---|---|---|---|---|---|---|---|---|---|---|---|---|
| button1234 | aaaaaaaa-ffff-49ab-acf8-5558888eeee | Cloud Service1 | /Quotation/ Company A | PDF | [Quotation No.]_ [Date]_[Time] | [Quotation No.] (10,20,5,10) | ... | | | | ... | |

FIG. 21

File name rule — 1101
[Quotation No.] [Date] — 704, 705

Information: — 1102
User name [Device name] [Date] [Time] — 706, 707
OCR: Quotation No. — 1106, 1103
[Desired character]

QUOTATION — 1104
B-B-B, Minato-ku, Tokyo, 100-9999

To: Shinagawa Co., Ltd. — 2101
[COMPANY] [OK] — 2102, 2103
ITEM NAME:

QUOTATION NUMBER: R12-3456
ISSUED DATE: 2017/09/10

| Item | Unit price | Quantity | Amount |
|---|---|---|---|
| GF-1544 | 11,550 | 3 | 34,650 |
| EF24-70 | 134,100 | 1 | 134,100 |
| | | Total amount | 168,750 |

Job Properties

Scan destination
Cloud Service1 — 1109

Root Folder
/Quotation/Company A — 1110

Output Setting
PDF — 1111

File Name
R12-3456_20170912_120032.pdf

[R12-3456]
R12-3456

Edit — 710

[Store]

INFORMATION PROCESSING APPARATUS USED FOR CONVERTING IMAGE TO FILE, IMAGE PROCESSING SYSTEM, METHOD OF CONTROLLING INFORMATION PROCESSING APPARATUS, AND STORAGE MEDIUM

BACKGROUND OF THE INVENTION

Field of the Invention

The present invention relates to an information processing apparatus used for converting an image to a file, an image processing system, a method of controlling the information processing apparatus, and a storage medium, and more particularly to an information processing apparatus that registers an image obtained by scanning a paper business form in a server, an image processing system, a method of controlling the information processing apparatus, and a storage medium.

Description of the Related Art

Conventionally, as a document management method, a method of scanning a paper document and converting the scanned image to a file is widely used. Further, there is a technique in which, when performing file conversion, character recognition processing (OCR processing) is performed on image data obtained by scanning a document, and the recognized characters are used for a file name of the document file and for file additional information, such as metadata information, for use by another system.

Japanese Laid-Open Patent Publication (Kokai) No. 2007-233913 discloses a technique in which an item name of an item value desired to extract from image data obtained by scanning a paper document and information indicating a relative position of the item value with respect to the item name are defined in advance, and the item value is automatically extracted when the paper document is scanned.

However, in the technique disclosed in Japanese Laid-Open Patent Publication (Kokai) No. 2007-233913, a user is required to set the item name and the information of location where the item value exists before scanning the paper document. Therefore, whenever an item value desired to extract from the image data obtained by scanning the paper document is added, the user is required to additionally set the item name and the information of location where the item value exists.

SUMMARY OF THE INVENTION

The present invention provides an information processing apparatus that is capable of reducing troublesome work of a user when converting an image obtained by newly scanning a business form to a file, an image processing system, a method of controlling the information processing apparatus, and a storage medium.

In a first aspect of the present invention, there is provided an information processing apparatus that sets, when converting an image obtained by scanning an original to a file, a file name of the image converted to the file, comprising at least one processor, and a memory coupled to the at least one processor, the memory having instructions that, when executed by the processor, perform the operations as: a display unit configured to display a preview image of the scanned original, a detection unit configured to detect that a character area on the preview image is selected by a user, an extraction unit configured to extract an item name candidate area based on location information of the character area selected by the user on the preview image, and a setting unit configured to set a character string included in the item name candidate area as an item name of a character string included in the character area selected by the user, wherein the display unit displays the set item name as a file name rule such that the set item name is selectable by a user.

In a second aspect of the present invention, there is provided an image processing system that includes an image processing apparatus, an information processing apparatus, and a cooperation service, and sets, when an image obtained by scanning an original in the image processing apparatus is converted to a file in the cooperation service, a file name of the image converted to the file in the information processing apparatus, wherein the information processing apparatus comprises at least one processor, and a memory coupled to the at least one processor, the memory having instructions that, when executed by the processor, perform the operations as: a display unit configured to display a preview image of the scanned original, and a detection unit configured to detect that a character area on the preview image is selected by a user, and wherein the cooperation service comprises an extraction unit configured to extract an item name candidate area based on location information of the character area selected by the user on the preview image, and a setting unit configured to set a character string included in the item name candidate area as an item name of a character string included in the character area selected by the user, and the display unit displays the set item name as a file name rule such that the set item name is selectable by a user.

In a third aspect of the present invention, there is provided a method of controlling an information processing apparatus that sets, when converting an image obtained by scanning an original to a file, a file name of the image converted to the file, comprising displaying a preview image of the scanned original, detecting that a character area on the preview image is selected by a user, extracting an item name candidate area based on location information of the character area selected by the user on the preview image, setting a character string included in the item name candidate area as an item name of a character string included in the character area selected by the user, and displaying the set item name as a file name rule such that the set item name is selectable by a user.

According to the present invention, it is possible to reduce troublesome work of a user when converting an image obtained by newly scanning a business form to a file.

Further features of the present invention will become apparent from the following description of exemplary embodiments (with reference to the attached drawings).

BRIEF DESCRIPTION OF THE DRAWINGS

FIG. 14 is a diagram showing an example of a table showing analysis result information stored in an HDD of the MFP cooperation service.

FIG. 19A is a diagram showing an example of a settings information management table held by a data management section of the MFP cooperation service in a case where a no settings-associated button is selected.

FIG. 19B is a diagram showing an example of a settings information management table held by the data management section of the MFP cooperation service in a case where a settings-associated button is selected.

FIG. 21 is a diagram showing another example of the file name edit screen used for explaining an example of the process in FIG. 20.

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential to the solution of the invention.

Figure 1:
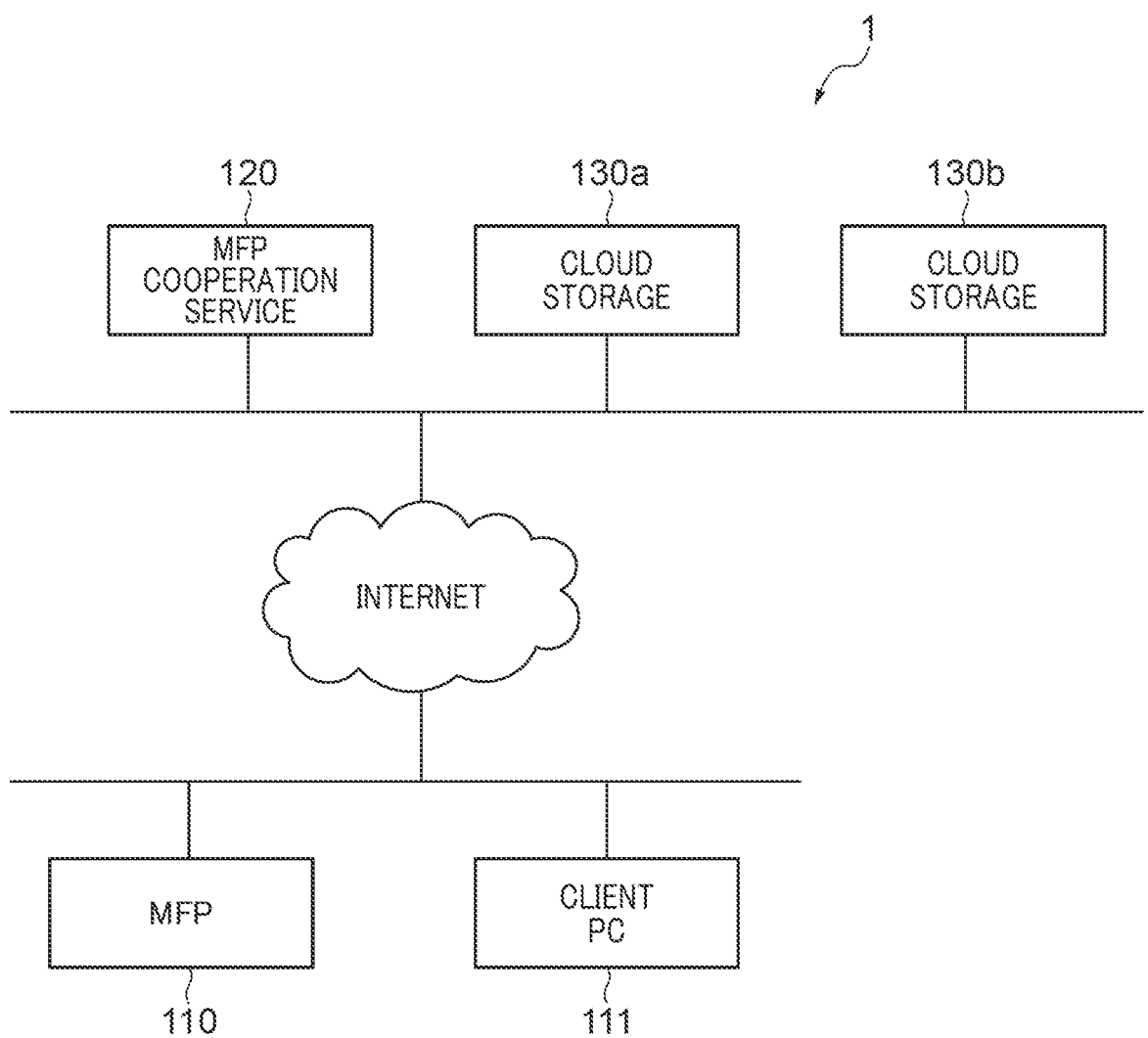
FIG. 1 is a diagram showing the whole configuration of an image processing system including a client PC as an information processing apparatus according to embodiments of the present invention.

FIG. 1 is a diagram showing the whole configuration of an image processing system 1 including a client PC (personal computer) 111 as an information processing apparatus according to the present embodiment.

The image processing system 1 includes a multifunction peripheral (MFP: image processing apparatus) 110, the client PC 111, an MFP cooperation service 120, and cloud storages 130a and 130b.

The MFP 110 and the client PC 111 are communicably connected to a web server, not shown, that provides a variety of cloud services on the Internet via a local area network (LAN).

The MFP 110 is a multifunction peripheral having a plurality of functions, such as a scanner and a printer, and is an example of an image forming apparatus. The client PC 111 is an information processing apparatus that receives services requested to the MFP cooperation service 120.

The MFP cooperation service 120 is a service provided by the web server, which includes a function of storing an image file scanned by the MFP 110 in the self-server and a function of transferring the image file to another service capable of storing a file, such as a storage service.

The cloud storages 130a and 130b each are a service provided by the web server, which is capable of storing a file received via the Internet and enables an external apparatus to acquire a file therefrom via a web browser.

Although the image processing system 1 is configured to be formed by the MFP 110, the client PC 111, the MFP cooperation service 120, and the cloud storages 130a and 130b, but the configuration of the image processing system 1 is not limited to this. For example, the MFP 110 may also serve as the client PC 111 or the MFP cooperation service 120. Further, the MFP cooperation service 120 may be arranged not on the Internet, but in a server on a LAN. Further, the cloud storages 130a and 130b may be replaced by an electronic mail service or the like such that the cloud storages 130a and 130b each receive an electronic mail to which a file is attached via the Internet and transmit this mail to a transmission destination.

Figure 2:
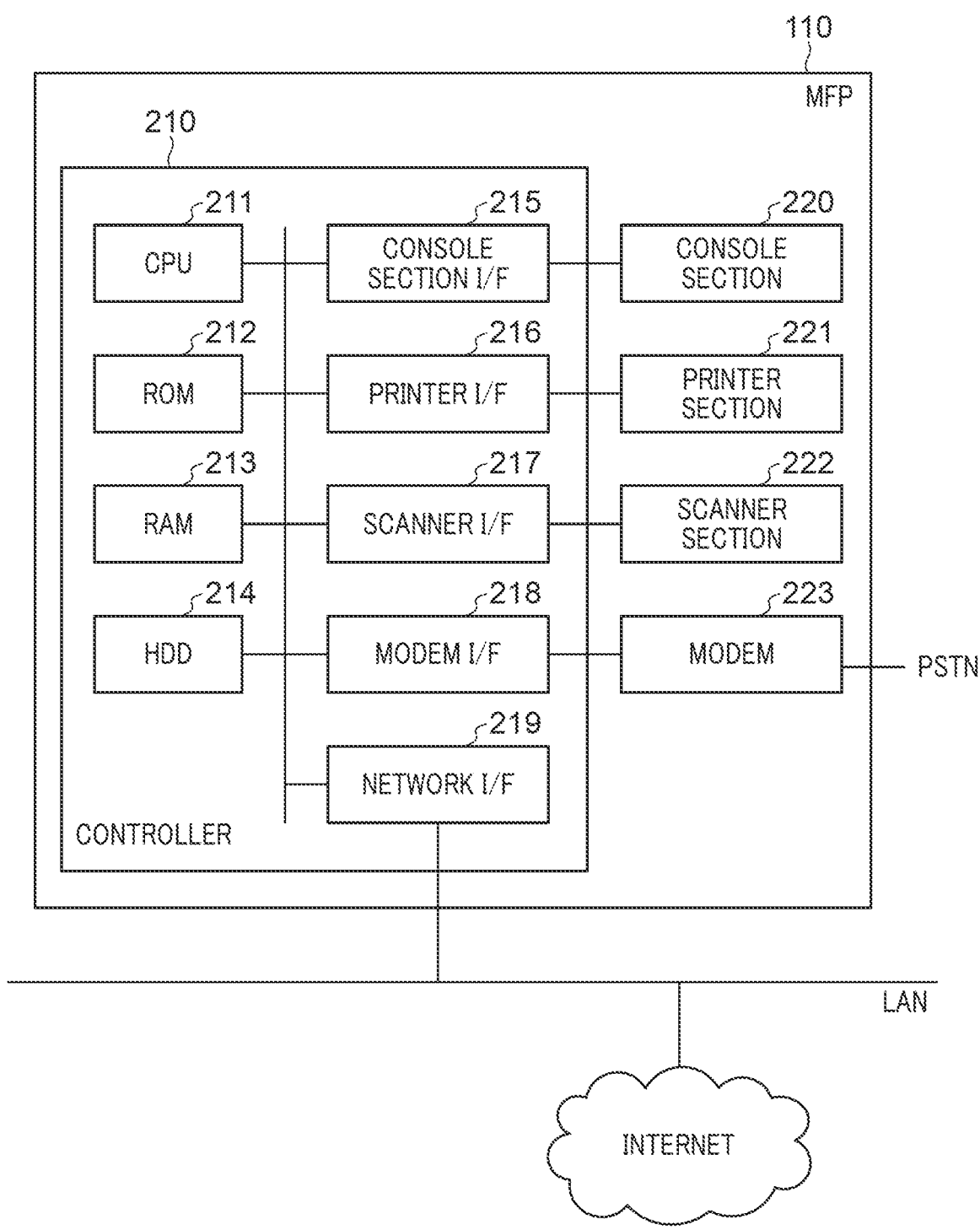
FIG. 2 is a diagram showing a hardware configuration of an MFP appearing in FIG. 1.

FIG. 2 is a diagram showing a hardware configuration of the MFP 110.

Referring to FIG. 2, the MFP 110 is comprised of a controller 210, a console section 220, a printer section 221, a scanner section 222, and a modem 223.

Further, the controller 210 is comprised of a CPU 211, a ROM 212, a RAM 213, an HDD 214, a console section interface 215, a printer interface 216, a scanner interface 217, a modem interface 218, and a network interface 219, and controls the overall operation of the MFP 110.

The CPU 211 loads control programs stored in the ROM 212 into the RAM 213 and thereby executes and controls a variety of functions equipped in the MFP 110, such as scan, print, and communication.

The RAM 213 is used as a temporary storage area, such as a main memory and a work area, for the CPU 211. Although in the present embodiment, one CPU 211 executes processes, described hereinafter, using one memory (the RAM 213 or the HDD 214), this is not limitative. For example, the processes may be executed by causing a plurality of CPUs and a plurality of RAMs or HDDs to cooperate.

The HDD 214 is a large-capacity storage section for storing image data and a variety of programs.

The console section interface 215 is an interface for connecting between the console section 220 and the controller 210. The console section 220 is provided with a liquid crystal display section having a touch panel function, a keyboard, and so forth, and receives an operation, an input, and an instruction provided by a user.

The printer interface 216 is an interface for connecting between the printer section 221 and the controller 210. Image data for printing is transferred from the controller 210 to the printer section 221 via the printer interface 216 and is printed on a recording medium, such as paper.

The scanner interface 217 is an interface for connecting between the scanner section 222 and the controller 210. The scanner section 222 reads an original set on an original platen glass or an auto document feeder (ADF), not shown, to generate image data and inputs the generated image data to the controller 210 via the scanner interface 217.

The MFP 110 is capable of not only printing out (copying) image data generated by the scanner section 222 from the printer section 221, but also transmitting the image data by file transmission or electronic mail transmission.

The modem interface 218 is an interface for connecting between the modem 223 and the controller 210. The modem 223 transmits and receives image data by facsimile communication to and from a facsimile apparatus, not shown, on a public switched telephone network (PSTN).

The network interface 219 is an interface for connecting the controller 210 (MFP 110) to the LAN. The MFP 110 transmits image data and information and receives a variety of information to and from each service on the Internet using the network interface 219.

Figure 3:
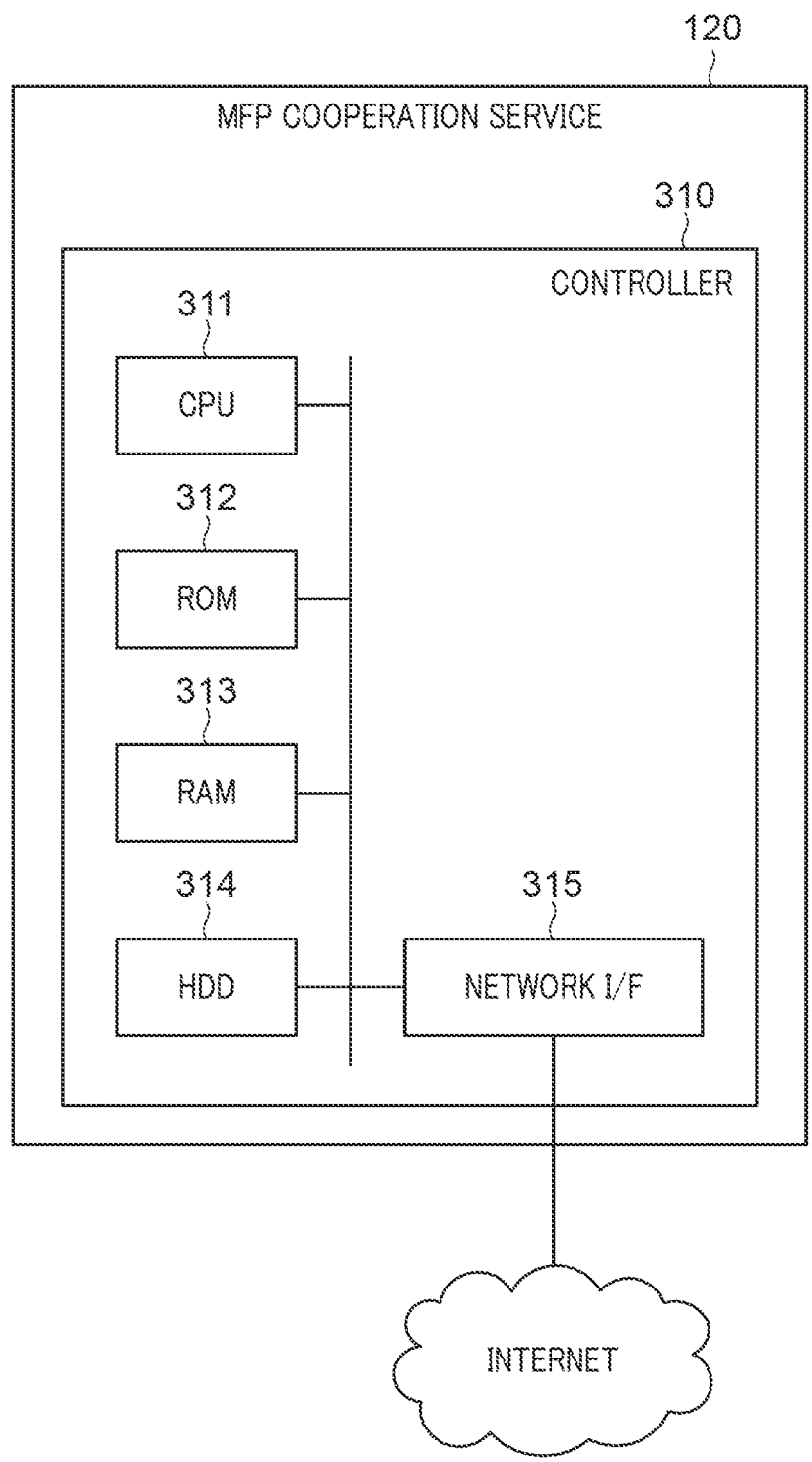
FIG. 3 is a diagram showing a hardware configuration of an MFP cooperation service appearing in FIG. 1.

FIG. 3 is a diagram showing a hardware configuration of the MFP cooperation service 120. Note that the hardware configuration of the client PC 111 is the same as that of the MFP cooperation service 120, and hence redundant description is omitted.

Referring to FIG. 3, the MFP cooperation service 120 is realized by a controller 310. The controller 310 is comprised of a CPU 311, a ROM 312, a RAM 313, an HDD 314, and a network interface 315 (connection unit).

The CPU 311 controls the overall operation of the MFP cooperation service 120 by loading control programs stored in the ROM 312 into the RAM 313 and executing a variety of processes.

The RAM 313 is used as a temporary storage area, such as a main memory and a work area, for the CPU 311.

The HDD 314 is a large-capacity storage section for storing image data and a variety of programs.

The network interface 315 is an interface for connecting the MFP cooperation service 120 to the Internet.

The MFP cooperation service 120 and the cloud storages 130a and 130b transmit and receive a variety of information to each other via the network interface 315 in response to a processing request received from another apparatus (such as the MFP 110).

Figure 4:
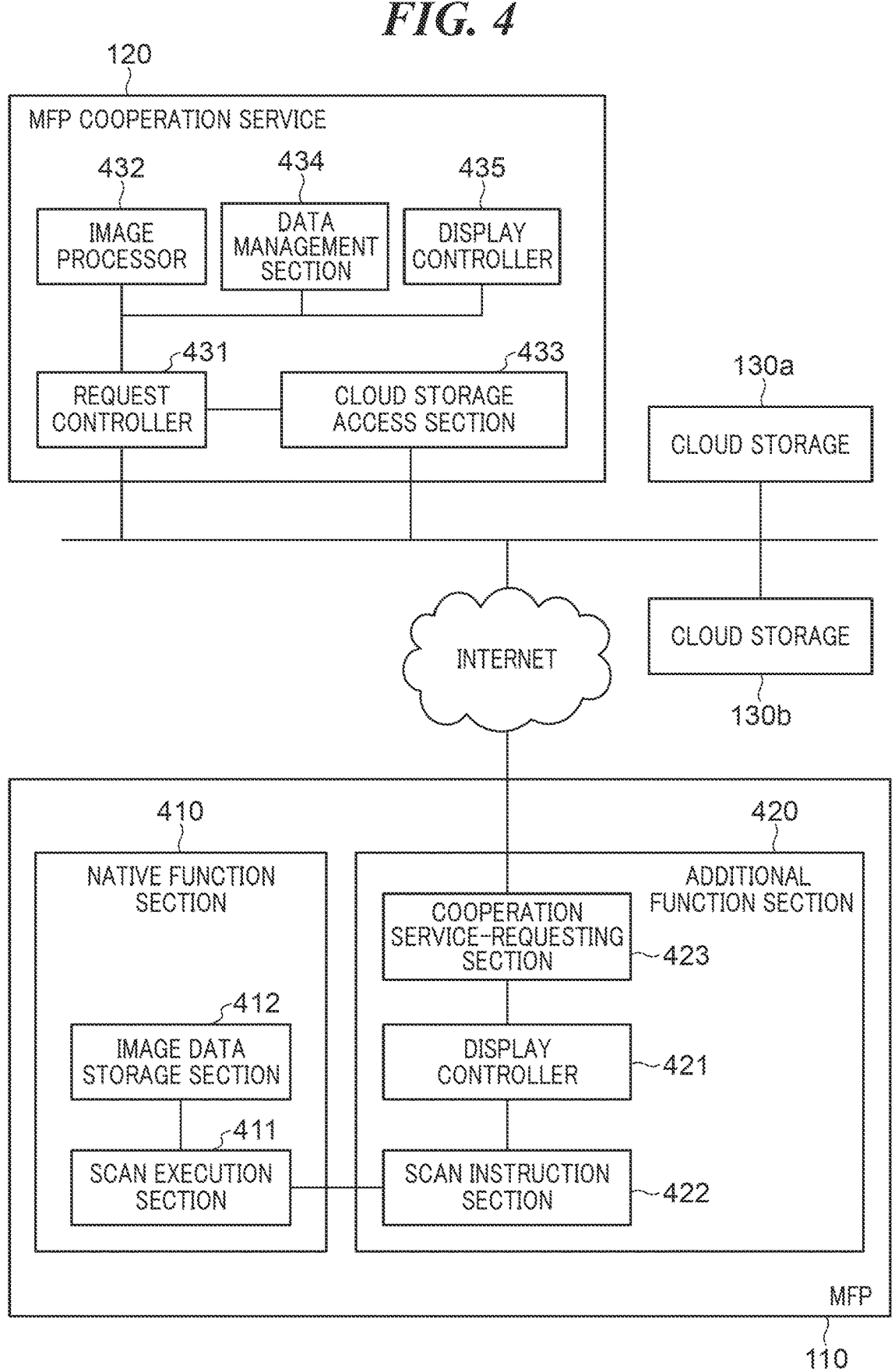
FIG. 4 is a diagram showing a software configuration of the image processing system.

FIG. 4 is a diagram showing a software configuration of the image processing system 1.

Referring to FIG. 4, the software of the MFP 110 is roughly divided into the two blocks of a native function section 410 and an additional function section 420. The native function section 410 and the additional function section 420 are realized by the CPU 211 that loads programs stored in the ROM 212 or the HDD 214 into the RAM 213 and executes the loaded programs. While sections included in the native function section 410 are provided in the MFP 110 as standards, the additional function section 420 is an application additionally installed in the MFP 110. More specifically, the additional function section 420 is an application based on Java (registered trademark) and can easily realize addition of functions to the MFP 110. Note that another additional application, not shown, may be installed in the MFP 110.

The native function section 410 includes a scan execution section 411 and an image data storage section 412.

The additional function section 420 includes a display controller 421, a scan instruction section 422, and a cooperative service-requesting section 423.

The display controller 421 displays a user interface (UI) screen for receiving an operation performed by a user on the liquid crystal display section of the console section 220, having the tough panel function, of the MFP 110. For example, the display controller 421 displays the UI screen for receiving authentication information for accessing the MFP cooperation service 120, a user's input of scan settings, and a user's instruction for starting a scan operation, on the liquid crystal display section of the console section 220.

The scan instruction section 422 requests the scan execution section 411 to execute scan processing with scan settings input by a user via the UI screen.

The scan execution section 411 receives the scan request including the scan settings from the scan instruction section 422. In response to the scan request, the scan execution section 411 generates scanned image data by controlling the scanner section 222 via the scanner interface 217 to read an original set on the original platen glass or the ADF. The generated scanned image data is sent to the image data storage section 412. The scan execution section 411 sends a scanned image identifier uniquely indicating scanned image data stored in the image data storage section 412 to the scan instruction section 422. The scanned image identifier is formed by digits, symbols, alphabetical letters, or the like (not shown) for uniquely identifying an image scanned by the MFP 110.

The image data storage section 412 stores the scanned image data received from the scan execution section 411 in the HDD 214.

The scan instruction section 422 acquires the scanned image data associated with the scanned image identifier received from the scan execution section 411, from the image data storage section 412. The scan instruction section 422 requests the cooperative service-requesting section 423 to instruct the MFP cooperation service 120 to process the acquired scanned image data.

The cooperative service-requesting section 423 requests the MFP cooperation service 120 to perform a variety of processing. For example, the cooperative service-requesting section 423 requests the MFP cooperation service 120 to perform login processing, processing for analyzing a scanned image, and so forth. For communication with the MFP cooperation service 120, REST, SOAP, or a like protocol, is used, but any other suitable communication means may be used.

In FIG. 4, the MFP cooperation service 120 includes a request controller 431, an image processor 432, a cloud storage access section 433, a data management section 434, and a display controller 435.

The request controller 431 remains on standby in a state capable of receiving a processing request from an external apparatus, and instructs, upon receipt of a processing request from an external apparatus, the image processor 432, the cloud storage access section 433, and the data management section 434 to perform processing according to contents of the received processing request, as required. For example, upon receipt of a login request as a processing request from the MFP 110, the request controller 431 instructs the data management section 434 to perform the login processing.

The image processor 432 performs character area analysis of image data, OCR (image recognition processing), similar business form determination (details will be described hereinafter) in a step S516 in FIG. 5A, described hereinafter, recognition processing and manipulation processing on an image, such as rotation and tilt correction of the image.

The cloud storage access section 433 transmits a processing request to the cloud storages 130a and 130b. The cloud storages 130a and 130b open a variety of interfaces for storing a file received via the Internet and enabling an external apparatus to acquire a stored file, using a general protocol, such as REST or SOAP. The cloud storage access section 433 operates the cloud storages 103a and 103b using the interfaces opened by the cloud storages 130a and 130b.

The data management section 434 holds user information, a variety of settings data, and so forth, which are managed by the MFP cooperation service 120.

The display controller 435 receives a request from a web browser operating on the client PC 111 or another terminal (not shown), such as a mobile terminal, connected via the Internet, and transmits screen configuration information (such as HTML or CSS) necessary for displaying a screen as a response. A user confirms user information registered in the MFP cooperation service 120 and changes settings used when performing scanning, via the screen displayed on the web browser.

Although the additional function section 420 is included in the MFP 110 in FIG. 4, the present invention is not limited to this configuration. For example, the additional function section 420 may be included in the client PC 111.

Next, a flow of the whole process according to the present embodiment will be described with reference to FIGS. 5A and 5B. Note that in this description, for simplification thereof, the cloud storages 130a and 130b are referred to as the cloud storage 130 in a case where they can be generically referred to.

Figure 5A:
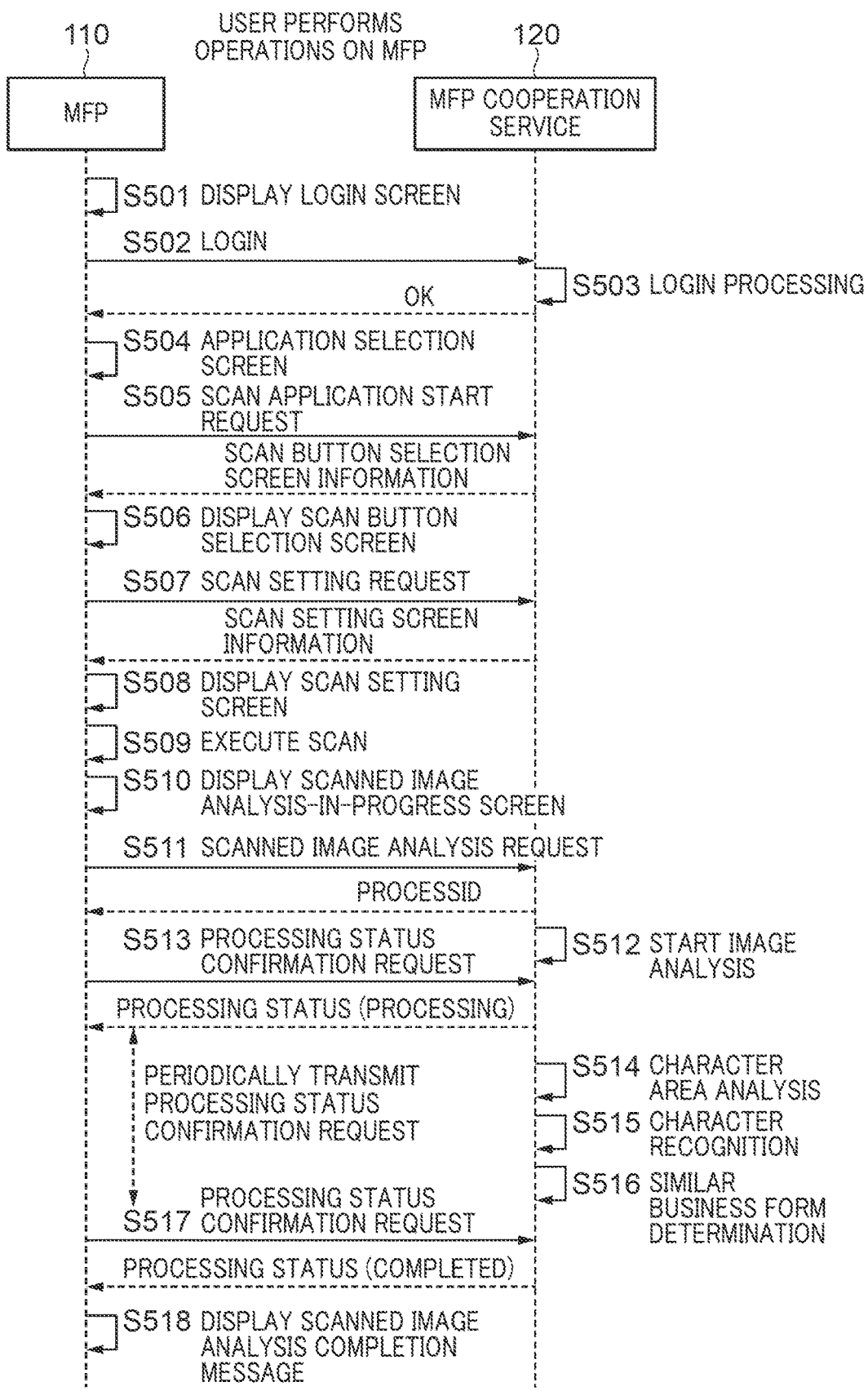
FIG. 5A is a sequence diagram from a step in which a user scans, on the MFP, a business form using a scan application to a step in which business form data is transmitted to the MFP cooperation service.
Figure 5B:
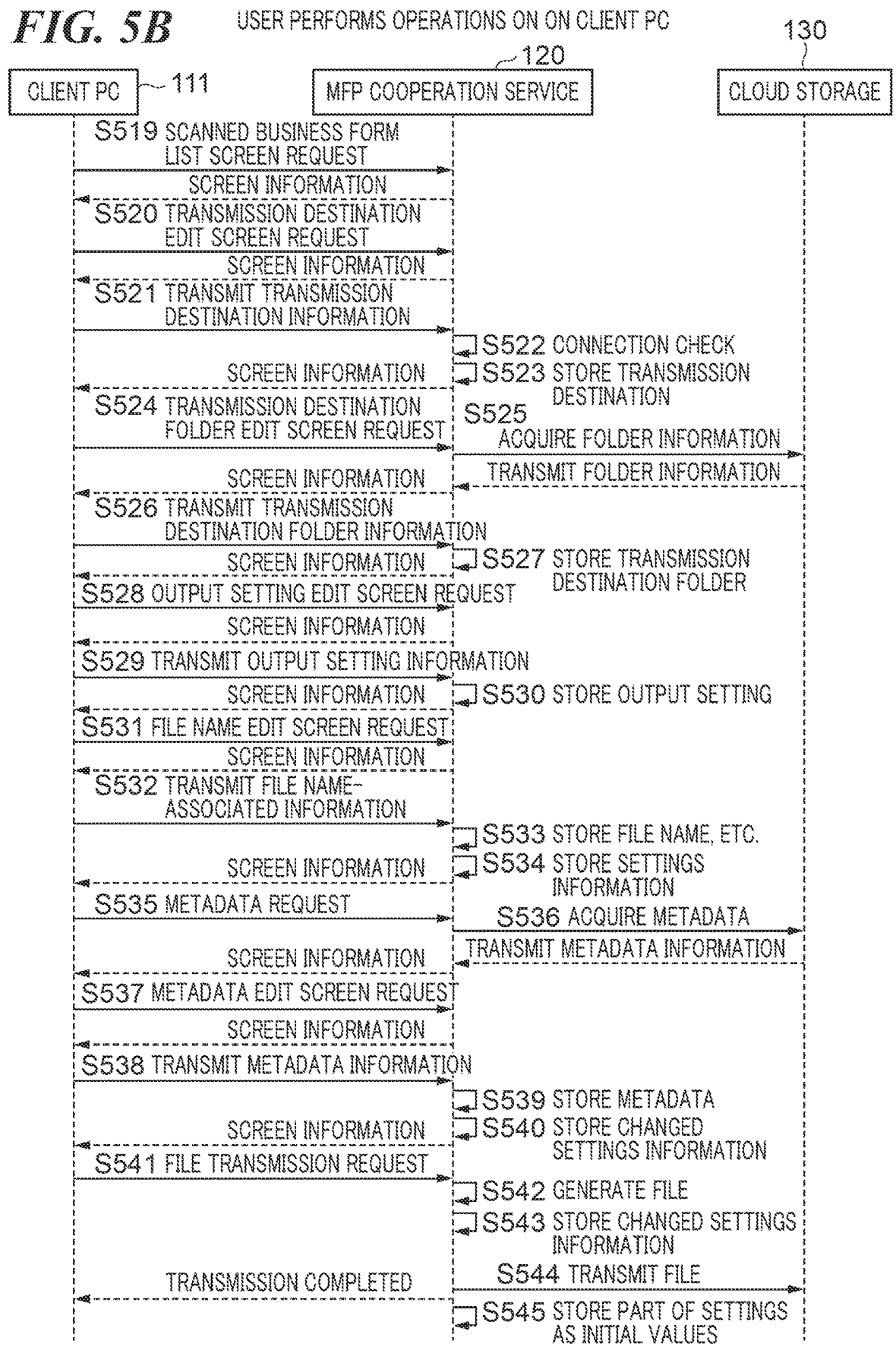
FIG. 5B is a sequence diagram from a step in which the user views and operates, on the client PC, a preview image of the business form data transmitted to the MFP cooperation service, to a step in which a file of a scanned business form is transmitted to a cloud storage.

FIGS. 5A and 5B are sequence diagrams showing a flow of a process performed between the MFP 110, the MFP cooperation service 120, and the cloud storage 130 when converting an image scanned by the MFP 110 to a file and transmitting the file to the cloud storage 130.

More specifically, FIG. 5A shows a sequence diagram from a step in which a user scans, on the MFP 110, a business form using a scan application to a step in which business form data is transmitted to the MFP cooperation service 120. FIG. 5B shows a sequence diagram from a step in which the user views and operates, on the client PC 111, a preview image of the business form data, which has been transmitted to the MFP cooperation service 120, to a step in which a file of a scanned business form is transmitted to the cloud storage 130. Here, the description will be given mainly of communication between the apparatuses.

The MFP 110 displays a main screen including a cloud service start button for executing cloud services provided by the web server, on the liquid crystal display section of the console section 220, which has the touch panel function (hereinafter simply referred to as the console section 220).

Note that an additional application for transmitting a business form scanned by the scanner section 222 to the cloud storage 130 (hereinafter referred to as the scan application) is installed in the MFP 110 in advance. With this, a button for using the function of the scan application becomes selectable by the user on an application selection screen displayed on the console section 220 in a step S504, described hereinafter. When the user clicks this button, a variety of screens required to transmit a business form scanned by the scanner section 222 to the MFP cooperation service 120, which are to be displayed on the MFP 110 in a step S506 et seq., are sequentially displayed on the console section 220 according to a user's operation.

Hereafter, details of the above-mentioned flow will be described.

First, in a step S501, when the cloud service start button displayed on the main screen is clicked by the user, the MFP 110 displays a login screen (not shown) for inputting authentication information to access the MFP cooperation service 120, on the console section 220.

In a step S502, when the user inputs a user name and a password required for login on the login screen displayed on the console section 220 and then clicks a login button, the MFP 110 transmits a login request to the MFP cooperation service 120. Here, the login request includes information of the user name and the password input by the user on the login screen. The MFP cooperation service 120 having received the login request proceeds to a step S503.

In the step S503, the MFP cooperation service 120 executes login processing for causing the data management section 434 to verify whether or not the user name and the password included in the login request are correct user name and password (performs user authentication). As a result of the login processing, if the user name and the password are correct, the MFP cooperation service 120 transmits an access token to the MFP 110 as a response. From this time on, the access token is included in a variety of requests transmitted from the MFP 110 to the MFP cooperation service 120, and the user having transmitted any of the requests can be identified by this information. The user authentication is performed by using a general known method (such as basic authentication, digest authentication, and authorization using OAuth).

Upon receipt of the access token from the MFP cooperation service 120, the MFP 110 determines that the login processing is completed and proceeds to the step S504.

In the step S504, the MFP 110 displays the application selection screen (not shown) that displays cloud services which can be used on the MFP 110 such that the cloud services are selectable by the user on the console section 220.

In a step S505, when the user clicks the scan application on the application selection screen, the MFP 110 transmits a scan application start request to the MFP cooperation service 120. Upon receipt of this scan application start request, the MFP cooperation service 120 acquires scan button selection screen information from the HDD 314 of the MFP cooperation service 120 and transmits the acquired information to the MFP 110. Note that the scan button selection screen information refers to information necessary for displaying a scan button selection screen for selecting a button to start scan processing which can be used by the user who has logged-in in the step S503. Upon receipt of the scan button selection screen information from the MFP cooperation service 120, the MFP 110 proceeds to the step S506.

Figure 6A:
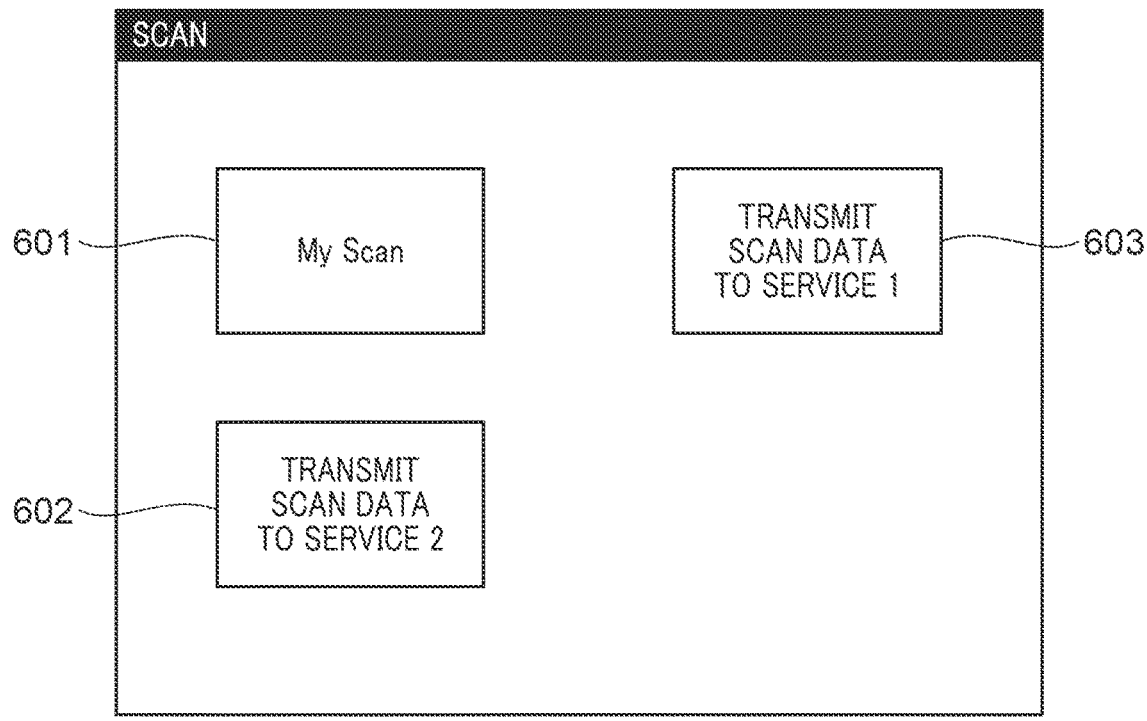
FIG. 6A is a diagram showing an example of a scan button selection screen displayed by the MFP.

In the step S506, the MFP 110 displays the scan button selection screen shown in FIG. 6A based on the scan button selection screen information.

Referring to FIG. 6A, the scan button selection screen displays scan buttons 601 to 603, which can be used by the user, out of scan buttons registered in the MFP cooperation service 120.

The scan button 601 is a button for which the scan settings, such as a cloud storage to which scan data is to be transmitted, a transmission destination folder, an output setting, and a file name, can be set from the client PC 111 (hereinafter also referred to as the no settings-associated button).

Both of the scan buttons 602 and 603 are buttons with which the scan settings set by the MFP cooperation service 120 in advance are associated (hereinafter each also referred to as the settings-associated button). More specifically, the scan button 602 is a button with which are associated the scan settings set by the MFP cooperation service 120, including the setting of the scan data transmission destination to the cloud storage 103*a*. Further, the scan button 603 is a button with which are associated the scan settings set by the MFP cooperation service 120, including the setting of the scan data transmission destination to the cloud storage 103*b*.

The user or an administrator of the MFP 110 is required to register scan settings associated with each of the scan buttons 602 and 603 as the settings-associated buttons (perform button registration), in the MFP cooperation service 120. On the other hand, the user is not required to perform button registration in the MFP cooperation service 120 for the no settings-associated button in advance, and hence only one no settings-associated button (the scan button 601 in the present example) is displayed on the scan button selection screen. Therefore, even if the administrator or the like has not performed button registration for any settings-associated button in the MFP cooperation service 120, the user can use the scan application. Further, the user can set desired scan settings when using the scan application without the help of the administrator. In the present embodiment, a detailed description will be given hereafter of a case where the user uses the scan button 601 as the no settings-associated button, by way of example.

When the user selects the scan button 601 as the no settings-associated button on the scan button selection screen, the process proceeds to a step S507.

In the step S507, the MFP 110 transmits a scan setting request to the MFP cooperation service 120, for requesting scan settings including scan settings set by default for the scan button 601 as the no settings-associated button. Upon receipt of this scan setting request, the MFP cooperation service 120 acquires scan setting screen information from the HDD 314 of the MFP cooperation service 120 and transmits the acquired information to the MFP 110. Upon receipt of the scan setting screen information from the MFP cooperation service 120, the MFP 110 proceeds to a step S508. Here, the scan setting screen information refers to information necessary for displaying a scan setting screen that displays the scan settings set by default.

Figure 6B:
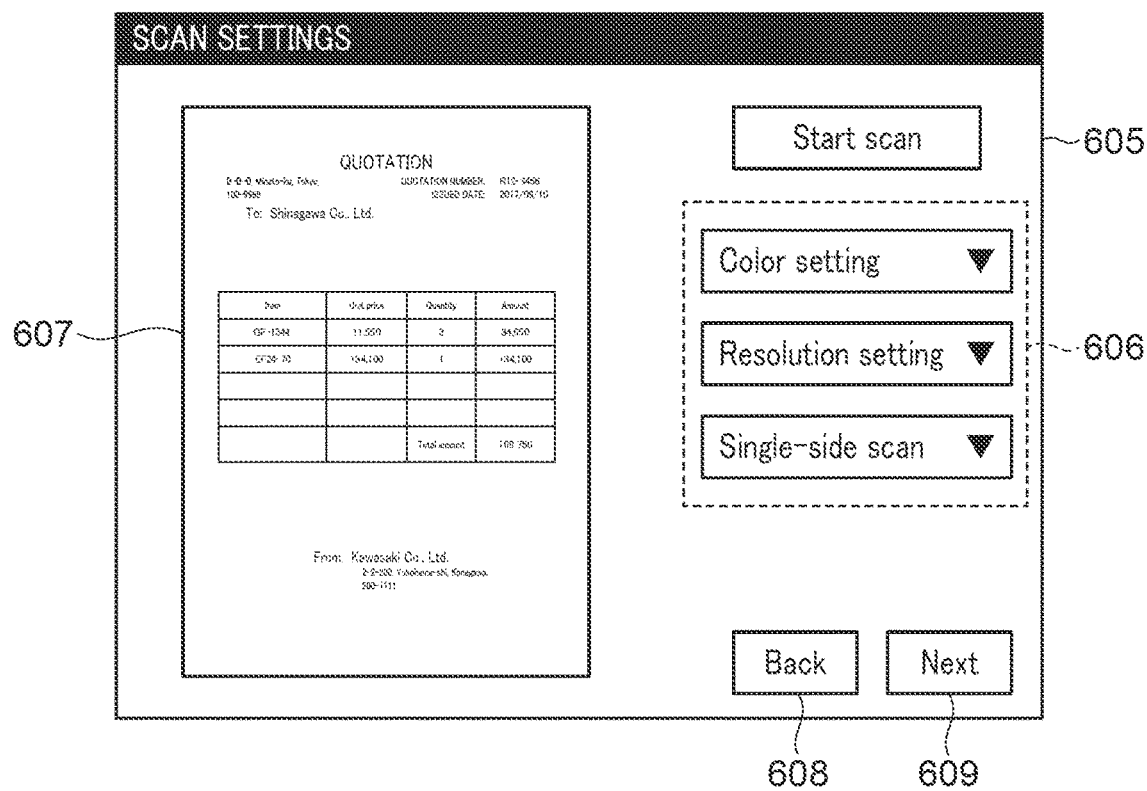
FIG. 6B is a diagram showing an example of a scan setting screen displayed by the MFP.

In the step S508, the MFP 110 displays the scan setting screen shown in FIG. 6B based on the scan setting screen information.

Referring to FIG. 6B, the scan setting screen displays a "start scan" button 605, a scan setting area 606, a preview area 607, a "back" button 608, and a "next" button 609.

The "start scan" button 605 is a button for executing scanning when a user clicks the button.

The scan setting area 606 is an area for receiving user's selection of a variety of settings related to scan reading, such as a color, a resolution, and double-sided reading. Note that in a case where a user has selected nothing with respect to the variety of settings displayed in the scan setting area 606, default values are set as the variety of settings related to scan reading.

The preview area 607 is an area for displaying a preview image of an original scanned by the scanner section 222.

The "back" button 608 is a button for returning the screen to the scan button selection screen shown in FIG. 6A.

The "next" button 609 is a button for subjecting the scan data to the next processing.

First, the user performs user selection with respect to the variety of settings displayed in the scan setting area 606 on the scan setting screen shown in FIG. 6B. Then, when the user sets an original (paper business form in the present example) on the original platen glass or the ADF of the scanner section 222 and clicks the "start scan" button 605, the process proceeds to a step S509.

In the step S509, the MFP 110 execute scanning of the paper business form by the scanner section 222 to generate image data (scan data) by converting a scanned image of the paper business form to electronic image data. Note that after generating the image data, a notification that scanning is completed may be displayed on the scan setting screen shown in FIG. 6B.

After execution of scanning the paper business form is terminated, when the user clicks the "next" button 609 on the scan setting screen shown in FIG. 6B, the process proceeds to a step S510.

In the step S510, the MFP 110 displays a scanned image analysis-in-progress screen on the console section 220.

Then, in a step S511, the MFP 110 transmits a scanned image analysis request to the MFP cooperation service 120 together with the scan data generated in the step S509. With this, the scan data received by the MFP cooperation service 120 is held in the HDD 314 of the MFP cooperation service 120 until the scan data is transmitted to the cloud storage 130. Upon receipt of the scanned image analysis request from the MFP 110, the MFP cooperation service 120 transmits, in response to this request, an identifier "process ID" uniquely indicating the analysis requested to the MFP cooperation service 120 to the MFP 110 and then proceeds to a step S512.

In the step S512, the MFP cooperation service 120 starts image analysis by the image processor 432. More specifically, in the MFP cooperation service 120, the request controller 431 receives the scanned image analysis request transmitted in the step S511. According to the scanned image analysis request, the request controller 431 inputs an image processing request and the scan data received from the MFP 110 (hereinafter referred to as the "current scanned business form image") to the image processor 432 in a state associated with the "process ID" transmitted to the MFP 110. Details of the image analysis process will be described hereinafter with reference to FIG. 13. On the other hand, in a step S513, the MFP 110 starts, using the "process ID" received as a response to the scanned image analysis request in the step S511, transmission of a request for confirming a processing status of the image analysis associated with the "process ID" to the MFP cooperation service 120.

When the image analysis is started in the step S512, first, in a step S514, the MFP cooperation service 120 analyzes character areas included in the current scanned business form image by the image processor 432.

Next, in a step S515, the MFP cooperation service 120 performs character recognition processing with respect to all of the character areas analyzed in the step S514, by the image processor 432.

Then, in the step S516, the MFP cooperation service 120 compares location information of all of the character areas analyzed in the step S514 and location information of images scanned in the past by the user having logged-in in the step S503, using the image processor 432. Then, as a result of the comparison, the MFP cooperation service 120 determines whether or not there is an image (hereinafter referred to as the "similar image") which was scanned in the past and has the location of the character areas, similar to that of the current scanned business form image. This determination is hereinafter referred to as the similar business form determination. As a result of the similar business form determination, if there is a similar image, the MFP cooperation service 120 attaches settings information set for the similar image to the current scanned business form image and stores the resulting image in the HDD 314 of the MFP cooperation service 120. On the other hand, as a result of the similar business form determination, if there is no similar image, the MFP cooperation service 120 stores information of the character areas of the whole current scanned business form image and information indicating that the current scanned business form image has no similar image, in the HDD 314 thereof. Note that the information of the image scanned in the past, used in the similar business form determination, is stored and accumulated in a state associated with the user who has logged-in in the step S503, by executing steps 534, 540, and 543, described hereinafter.

Note that details of the steps S514 to S516 will be described with reference to FIG. 13.

The processing status confirmation request started in the step S513 is periodically performed (e.g. at intervals of approximately several hundred msec to several seconds). Although not shown in FIG. 5A, the processing status confirmation request started in the step S513 is repeatedly performed until, in response to the processing status confirmation request performed in a step S517, the MFP 110 acquires a response of completion of image processing ("completed") from the MFP cooperation service 120, and then the process proceeds to a step S518. More specifically, upon receipt of the processing status confirmation request, the MFP cooperation service 120 confirms the status of the processing associated with the "process ID". As a result of this confirmation, if one of the processing operations in the steps S514 to S516 is being executed, the MFP cooperation service 120 transmits a processing status ("processing") as a response. On the other hand, if the processing in the step S516 has been terminated, the MFP cooperation service 120 transmits a processing status ("completed") as a response.

More specifically, the response to the processing status confirmation request includes a character string indicating the current processing status in its "status". For example, when "status" indicates "processing", this indicates that the processing is being executed (in progress) in the MFP cooperation service 120, and when the "status" indicates "completed", this indicates that the processing has been completed.

Note that in a case where one of the processing operations in the steps S514 to S516 has failed, the MFP cooperation service 120 transmits a response including a character string indicating another processing status, such as "failed", in its "status". In this case, the MFP 110 displays a message that analysis of the scanned image has failed, on the console section 220, followed by terminating the present process.

In the step S518, the MFP 110 displays a completion message that the image analysis on the current scanned business form image is completed, on the console section 220 of the MFP 110, and then returns to the step S508 to display the scan setting screen again on the console section 220. With this, in a case where there are a plurality of paper business forms to be scanned, it is possible to scan each of the plurality of paper business forms whenever the scan setting screen is displayed again in the step S508 (the steps S508 to S518 are repeatedly executed). Further, by instructing a setting for dividing scanned document by using a fixed number of pages or by using partition sheets before scanning, it is possible to collectively scan the plurality of paper business forms at one time and divide them into a plurality of sets of business forms.

When the completion message is displayed on the console section 220 of the MFP 110 in the step S518 in FIG. 5A, the user moves from the MFP 110 to the client PC 111. After that, the user performs the input/selection operation on a scanned business form list screen (see FIG. 7) displayed on a display, not shown, of the client PC 111, using a console section, not shown, of the same. With this, the user sets file additional information, such as the cloud storage 130 to which scan data is to be transmitted, a transmission destination folder, an output setting, a file name, and metadata, for each scan data item generated by scanning the paper business form in the step S508. Although not shown in FIG. 5B, described hereinafter, the user accesses the MFP cooperation service 120 from the client PC 111 in advance and performs the same login processing as that performed on the MFP 110. With this, the user is enabled to display the scanned business form list screen (see FIG. 7) on the client PC 111 and perform the above-described setting for transmission of the scanned business form scanned by himself/herself.

Next, the sequence shown in FIG. 5B will be described.

In a step S519, the client PC 111 requests the MFP cooperation service 120 to transmit information of a scanned business form list screen for confirming the list of business forms scanned by the user. The MFP cooperation service 120 transmits screen information necessary for displaying the scanned business form list screen (see FIG. 7) to the client PC 111 in response to this request. Upon receipt of this screen information from the MFP cooperation service 120, the client PC 111 displays the scanned business form list screen (see FIG. 7) on the display based on the received screen information.

Figure 7:
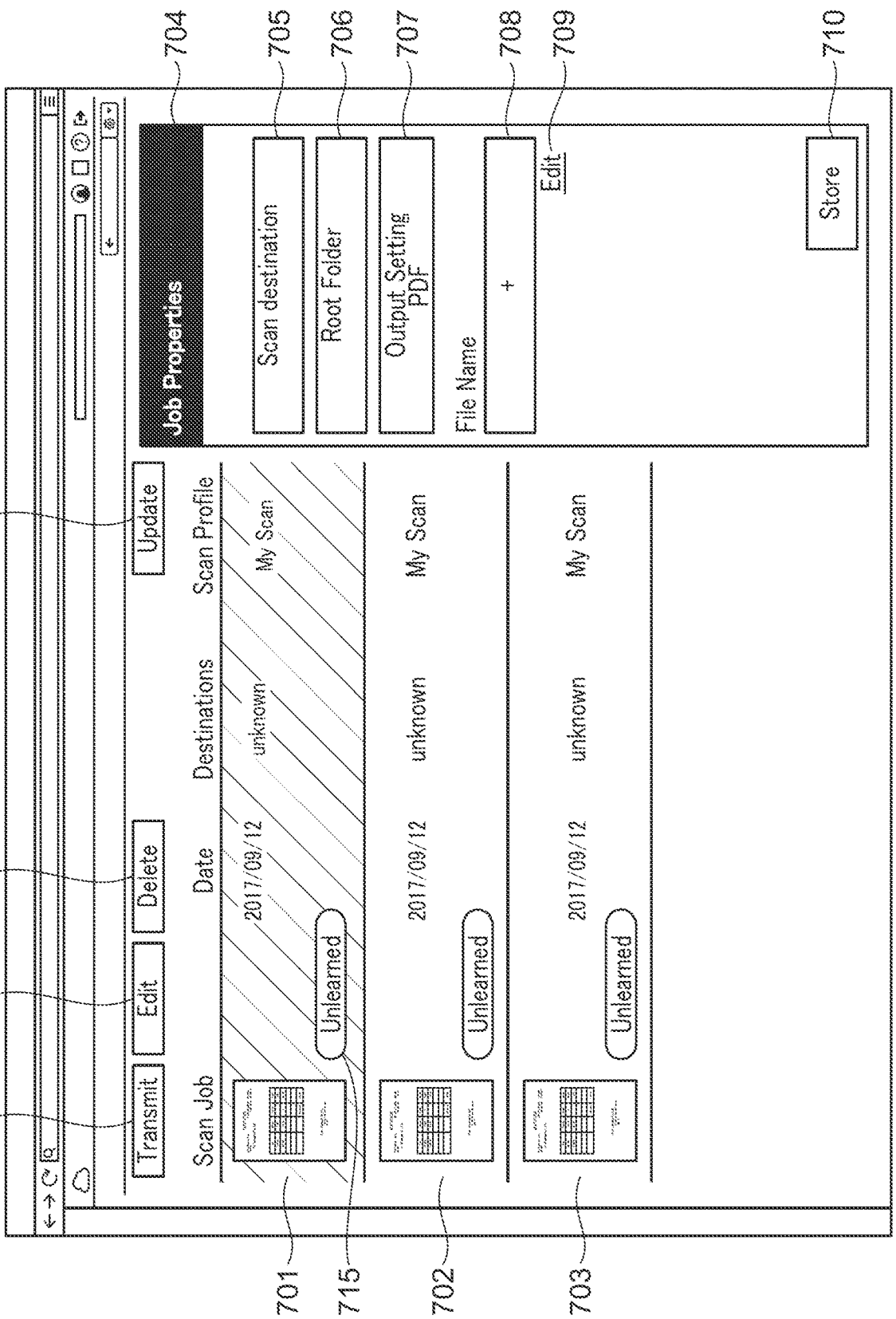
FIG. 7 is a diagram showing an example of a scanned business form list screen displayed by the client PC.

FIG. 7 is a diagram showing the scanned business form list screen displayed by the client PC 111.

Scanned business forms 701 to 703 display a list of information on paper business forms (scanned business forms) scanned by the user using the MFP 110 and the user can select one of them. In the illustrated example in FIG. 7, the scanned business form 701 has been selected by the user, and hence the scanned business form 701 is grayed.

A job properties area 704 is an area for displaying information on job properties of a scanned business form (the scanned business form 701 in the present example), out of the scanned business forms 701 to 703, which has been selected by the user.

The job properties area 704 includes a transmission destination-setting button 705 denoted as Scan Destination, a transmission destination folder-setting button 706 denoted as Root Folder, an output setting button 707 in which a setting of "PDF" is denoted in the illustrated example, a file name-editing button 708, an edit button 709, and a button 710 which is set to "store" in the illustrated example.

The transmission destination-setting button 705 is a button for displaying a screen to set a cloud storage 130 to which the scanned business form 701 selected by the user is to be transmitted.

The transmission destination folder-setting button 706 is a button for displaying a screen for setting, after setting the transmission destination cloud storage 130 by clicking the transmission destination-setting button 705, a transmission destination folder in the cloud storage 130 set as the transmission destination.

The output setting button 707 is a button for displaying a screen for setting an output setting, such as a stored file format, used when the scanned business form 701 selected by the user is stored.

The file name-editing button 708 is a button for displaying an edit screen for setting a file name and the like using characters included in the preview image of the scanned business form 701 selected by the user.

The edit button 709 is a button for setting a file name by directly inputting text.

The button 710 is a button for storing settings in the job properties area 704 after completing setting of the job properties information of the scanned business form 701 selected by the user, or for transmitting the scanned business form selected by the user to the set transmission destination. Note that the button 710 has its button name switched to "store" or "transmit" according to the contents of setting of the job properties information of the scanned business form 701 selected by the user. Further, in a case where a setting required to store the settings or transmit the scanned business form has not been made for the job properties information of the scanned business form 701 selected by the user, the button 710 is displayed in a disabled state.

A transmission button 711 is a button for transmitting a selected scanned business form.

An edit button 712 is a button for displaying a file name edit screen, described hereinafter with reference to FIG. 11A. The edit screen is a screen on which a character string within a preview image of a scanned business form selected by the user is selected and input, and is used to input a file name and metadata, described hereinafter.

A delete button 713 is a button for deleting data of a selected scanned business form.

An update button 714 is a button that is enabled in a case where the MFP cooperation service 120 has a scanned business form which has not been displayed in the list on the scanned business form list screen yet. When the user clicks the update button 714, the scanned business form list screen on the client PC 111 is updated, and the scanned business forms currently held in the MFP cooperation service 120 are all displayed in the list.

An unlearned tag 715 is a tag attached to a scanned business form, which is determined to have no similar business form by the similar business form determination, out of the scanned business forms displayed in the list in FIG. 7. In the illustrated example, since it is determined that there is no similar business form corresponding to the scanned business form 701 selected by the user, learned data does not exist, so that the unlearned tag 715 is attached to the scanned business form 701.

Thus, in FIG. 7, the scanned business form 701 is selected by the user, and the job properties area 704 for the scanned business form 701 is displayed.

Further, since the unlearned tag 715 is attached to the scanned business form 701, it is clear that the user has never scanned a business form similar to the scanned business form 701. Note that in a case where the user has scanned a business form similar to the scanned business form 701 selected by the user, the setting made by the user with respect to the similar business form is reflected on each setting in the job properties area 704. However, in the illustrated example in FIG. 7, the user has never scanned a business form similar to the scanned business form 701. Therefore, default values are indicated in the transmission destination-setting button 705, the transmission destination folder-setting button 706, the output setting button 707, and the file name-editing button 708, in the job properties area 704. More specifically, the transmission destination-setting button 705 indicates that the transmission destination cloud storage 130 has not been set, and the transmission destination folder-setting button 706 indicates that the transmission destination folder has not been set. Further, the output setting button 707 indicates that the output setting is set to PDF, and the file name-editing button 708 indicates that the file name is blank.

Thus, it is possible to set, for a (unlearned) business form, which has no similar business form, out of the paper business forms scanned by the MFP 110 after clicking the scan button 601 as the no settings-associated button, settings including the transmission destination cloud storage 130, afterwards one by one.

Referring again to FIG. 5B, when the user clicks the transmission destination-setting button 705, the process proceeds to a step S520.

In the step S520, the client PC 111 requests the MFP cooperation service 120 to transmit a transmission destination edit screen. The MFP cooperation service 120 transmits screen information necessary for displaying the transmission destination edit screen (see FIG. 8) to the client PC 111 in response to this request. Upon receipt of this screen information from the MFP cooperation service 120, the client PC 111 displays the transmission destination edit screen (see FIG. 8) on the display based on the received screen information.

Figure 8:
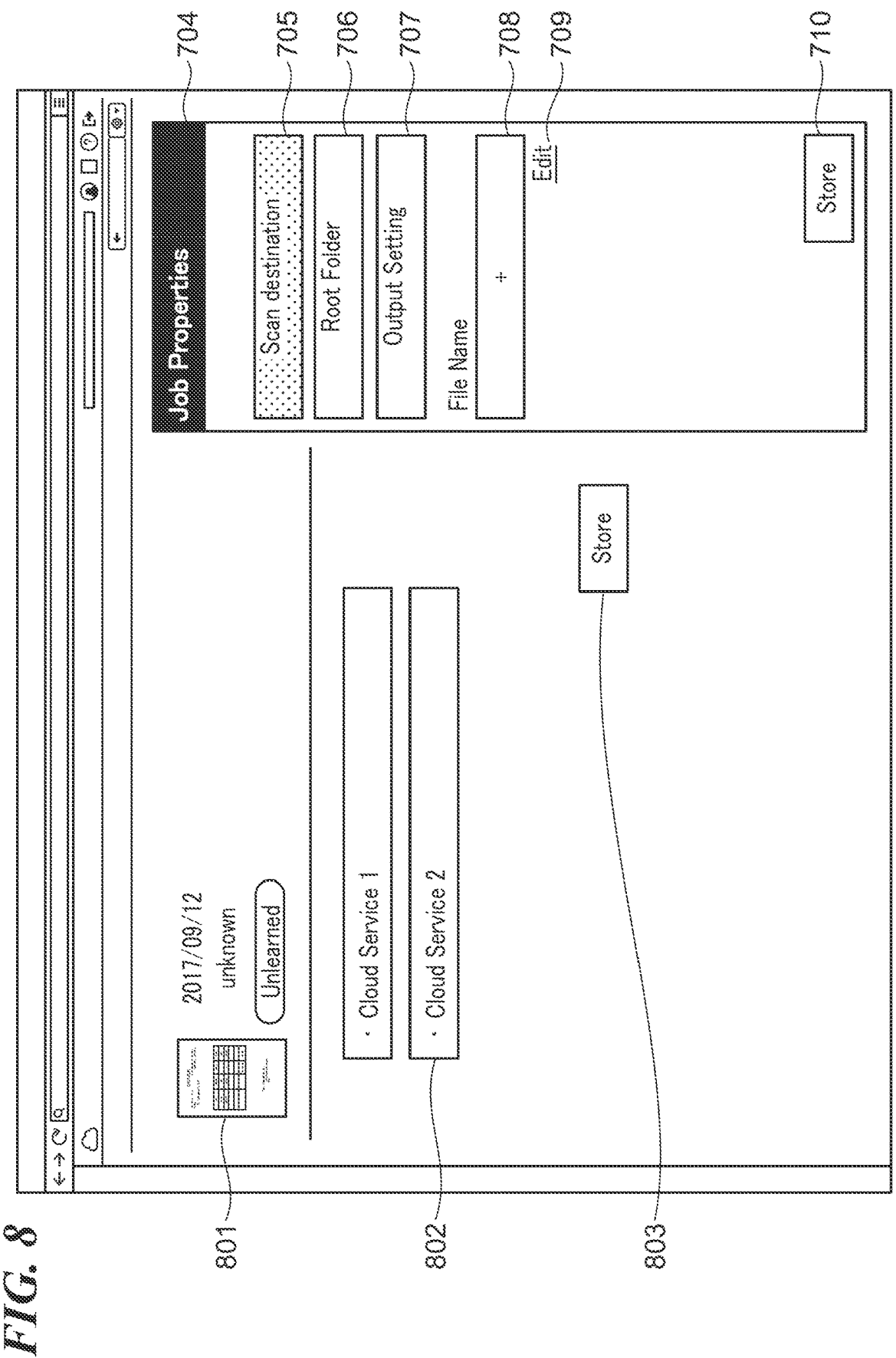
FIG. 8 is a diagram showing an example of a transmission destination edit screen displayed by the client PC.

FIG. 8 is a diagram showing the transmission destination edit screen displayed by the client PC 111.

A scanned business form 801 displays information on a scanned business form as a target to which the user sets the transmission destination.

A transmission destination list 802 displays a list of a plurality of cloud storages 130 from which the user can select the transmission destination.

A storage button 803 is a button for storing a cloud storage 130 selected from the transmission destination list 802 by the user as the transmission destination. When the user selects one cloud storage 130 from the transmission destination list 802 and clicks the storage button 803, the process proceeds to a step S521 in FIG. 5B.

In the step S521, the client PC 111 transmits information on the transmission destination selected by the user on the transmission destination edit screen shown in FIG. 8 to the MFP cooperation service 120.

In a step S522, the MFP cooperation service 120 performs connection check for determining whether or not it is possible to access the cloud storage 130 selected by the user based on the information on the transmission destination transmitted from the client PC 111 in the step S521. More specifically, in a case where the MFP cooperation service 120 holds authentication information necessary for the user to access the cloud storage 130 selected by the user (hereinafter referred to as the "cloud storage access authentication information"), it is determined that it is accessible. On the other hand, in a case where the MFP cooperation service 120 does not hold the cloud storage access authentication information, it is determined that it is not accessible. If it is determined that it is accessible, the MFP cooperation service 120 proceeds to a step S523 and performs transmission destination storing processing for storing the cloud storage 130 selected by the user as the destination to which the scanned business form selected by the user is to be transmitted. On the other hand, if it is determined that it is not accessible, the MFP cooperation service 120 notifies the client PC 111 that authentication for the cloud storage 130 selected by the user is required. In response to this notification, the client PC 111 displays a login screen for accessing the cloud storage 130 selected by the user. Then, when the cloud storage access authentication information is input to this login screen by the user, the client PC 111 transmits this authentication information to the MFP cooperation service 120. The MFP cooperation service 120 stores the cloud storage access authentication information transmitted from the client PC 111 and confirms whether or not it is possible to access the cloud storage 130 selected by the user using the cloud storage access authentication information. After it is confirmed that it is possible to access the cloud storage 130, the MFP cooperation service 120 proceeds to the step S523 and performs the transmission destination storing processing for storing the cloud storage 130 selected by the user as the destination to which the scanned business form is to be transmitted.

When the transmission destination storing processing in the step S523 is completed, the MFP cooperation service 120 transmits screen information necessary for displaying the scanned business form list screen in a state updated with the transmission destination information selected by the user to the client PC 111.

Upon receipt of this screen information from the MFP cooperation service 120, the client PC 111 displays the updated scanned business form list screen on the display based on the received screen information.

More specifically, the name of the cloud storage 130 selected by the user is reflected on an area under a column for displaying the cloud storage 130 as the transmission destination of the scanned business form 701 and the display contents of the transmission destination-setting button 705.

At this time, in a case where the cloud storage 130 selected by the user as the transmission destination is a cloud storage 130 not storing metadata information, the display name of the button 710 is changed from "store" to "transmit". On the other hand, in case where the cloud storage 130 selected by the user as the transmission destination is a cloud storage 130 storing metadata information, the display name of the button 710 remains unchanged from "store".

Further, on the updated scanned business form list screen, the transmission destination folder-setting button 706 is changed from the disabled state to the enabled state. When the user clicks the transmission destination folder-setting button 706, the process proceeds to a step S524 in FIG. 5B.

In the step S524, the client PC 111 requests the MFP cooperation service 120 to transmit information on a transmission destination folder edit screen.

In a step S525, according to this request, the MFP cooperation service 120 acquires folder information from the cloud storage 130 selected by the user using the cloud storage access authentication information held in the self-apparatus. Then, the MFP cooperation service 120 transmits screen information necessary for displaying the transmission destination folder edit screen on which the acquired folder information is displayed to the client PC 111.

Upon receipt of the screen information from the MFP cooperation service 120, the client PC 111 displays the transmission destination folder edit screen on the display based on the received screen information.

Figure 9:
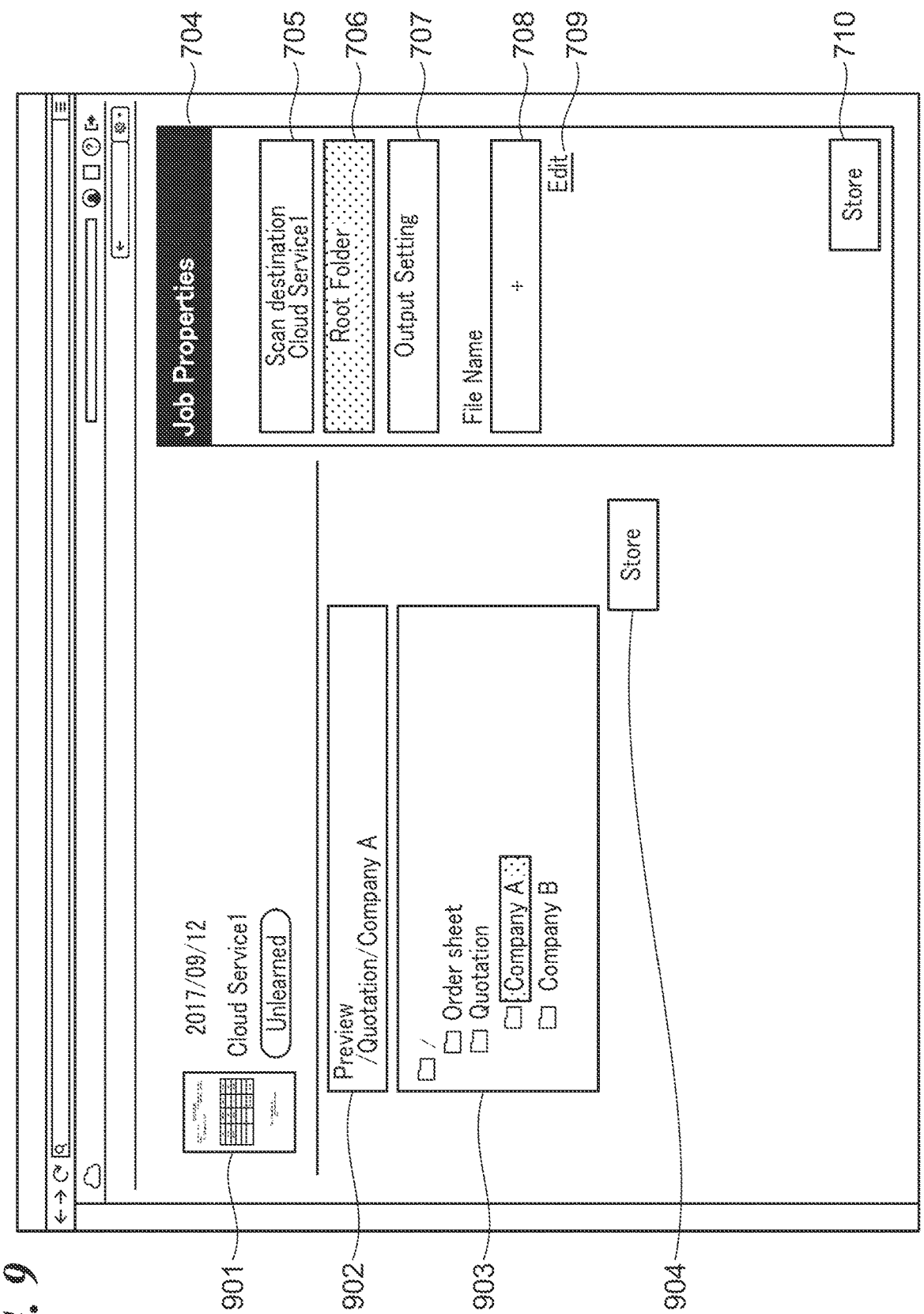
FIG. 9 is a diagram showing an example of a transmission destination folder edit screen displayed by the client PC.

FIG. 9 is a diagram showing an example of the transmission destination folder edit screen displayed by the client PC 111.

A scanned business form 901 displays information on a scanned business form as a target for which the transmission destination folder is to be edited by the user.

A path 902 displays a path of the transmission destination folder being currently selected by the user.

A tree view 903 displays the folder information acquired from the cloud storage 130 selected by the user as a tree view. The user selects a transmission destination folder by clicking one of folders displayed on the tree view 903.

A storage button 904 is a button for storing a folder selected by the user as a transmission destination folder. When the user clicks one of the folders displayed on the tree view 903, and then clicks the storage button 904, the process proceeds to a step S526 in FIG. 5B.

In the step S526, the client PC 111 transmits information on the transmission destination folder selected by the user on the transmission destination folder edit screen shown in FIG. 9 to the MFP cooperation service 120.

In a step S527, the MFP cooperation service 120 stores the information on the transmission destination folder transmitted from the client PC 111 in the step S526 as the information on the transmission destination folder of the scanned business form. Then, the MFP cooperation service 120 transmits screen information necessary for displaying the scanned business form list screen in a state updated with the information of the transmission destination folder selected by the user to the client PC 111.

Upon receipt of this screen information from the MFP cooperation service 120, the client PC 111 displays the updated scanned business form list screen based on the received screen information. At this time, in a case where the settings have been set using the transmission destination-setting button 705 and the transmission destination folder-setting button 706, and also the transmission destination indicated on the transmission destination-setting button 705 is a cloud storage 130 storing metadata, the button 710 being displayed as "store" is changed from the disabled state to the enabled state.

After that, when the user clicks the output setting button 707, the process proceeds to a step S528.

In the step S528, the client PC 111 requests the MFP cooperation service 120 to transmit information on an output setting edit screen. In response to this request, the MFP cooperation service 120 transmits screen information necessary for displaying the output setting edit screen (see FIG. 10). Upon receipt of this screen information from the MFP cooperation service 120, the client PC 111 displays the output setting edit screen (see FIG. 10) on the display based on the received screen information.

Figure 10:
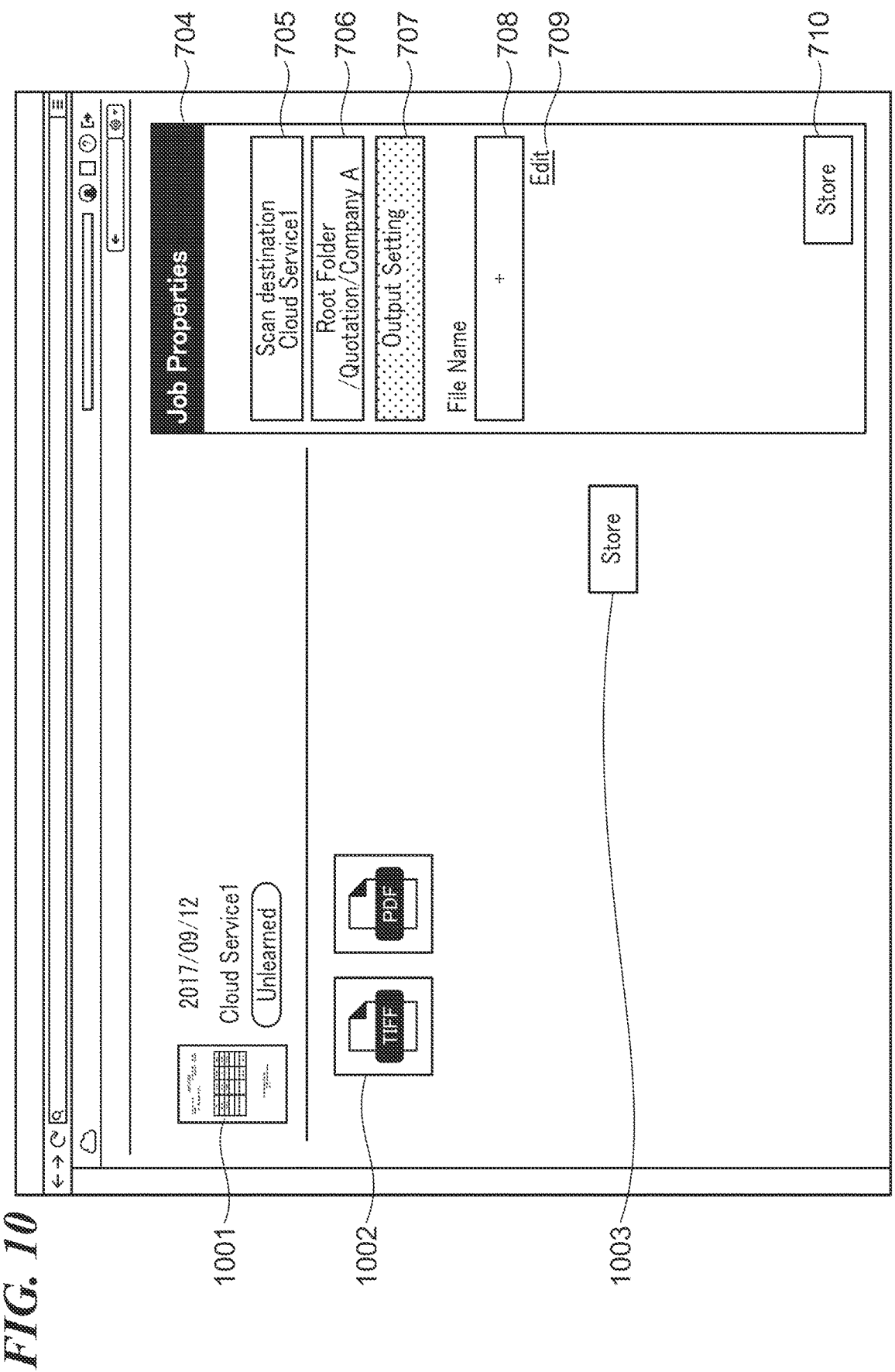
FIG. 10 is a diagram showing an example of an output setting edit screen displayed by the client PC.

FIG. 10 is a diagram showing an example of the output setting edit screen displayed by the client PC 111.

A scanned business form 1001 displays information on a scanned business form as a target for which the output setting is to be edited by the user.

An output setting list 1002 displays a list of output settings from which the user selects. In the illustrated example in FIG. 10, stored file formats are displayed, and cloud compression PDF which is the default value and TIFF are displayed as choices. When the user selects one output setting from the output setting list 1002, and clicks a storage button 1003, the process proceeds to a step S529 in FIG. 5B.

In the step S529, the client PC 111 transmits the output setting information selected by the user on the output setting edit screen shown in FIG. 10 to the MFP cooperation service 120.

In a step S530, the MFP cooperation service 120 stores the output setting information transmitted from the client PC 111 in the step S529 as the output setting information of the scanned business form. After that, the MFP cooperation service 120 transmits screen information necessary for displaying the scanned business form list screen in a state updated by the output setting information selected by the user to the client PC 111.

Upon receipt of this screen information from the MFP cooperation service 120, the client PC 111 displays the updated scanned business form list screen on the display based on the received screen information.

After that, when the user clicks the file name-editing button 708, the process proceeds to a step S531.

In the step S531, the client PC 111 requests the MFP cooperation service 120 to transmit information on a file name edit screen. In response to this request, the MFP cooperation service 120 transmits screen information necessary for displaying the file name edit screen (see FIG. 11A), including a preview image of the scanned business form, coordinates of character areas, and character recognition results. Upon receipt of this screen information from the MFP cooperation service 120, the client PC 111 displays the file name edit screen (see FIG. 11A) on the display based on the received screen information.

Figure 11A:
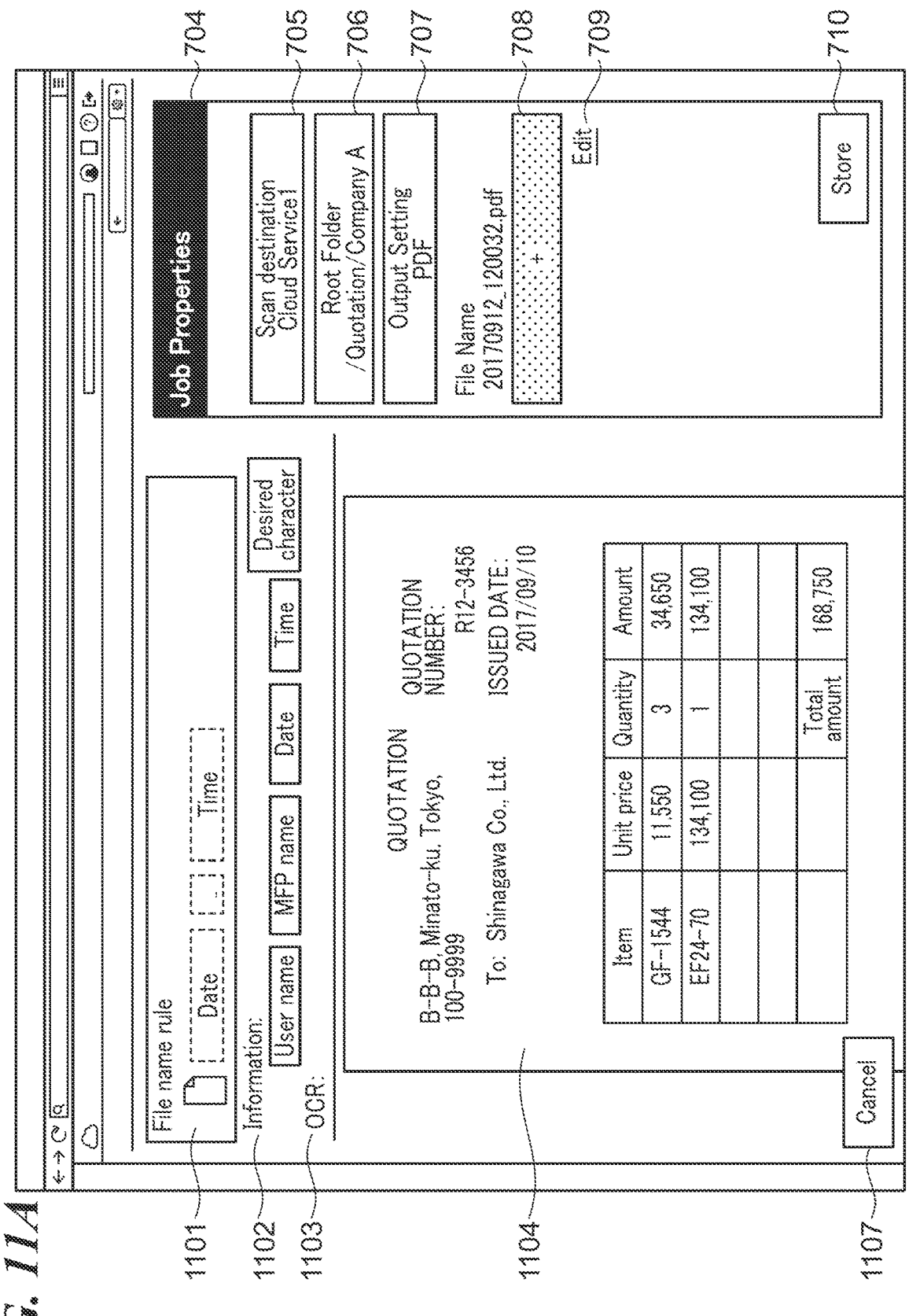
FIG. 11A is a diagram showing an example of a file name edit screen displayed by the client PC in a case where a character string to be used for a file name has not been selected from a preview image of a scanned business form yet.

FIG. 11A is a diagram showing an example of the file name edit screen displayed by the client PC 111. FIG. 11A shows an example of the file name edit screen displayed in a case where a character string to be used for a file name has not been selected from the preview image of the scanned business form yet.

A file name rule-setting area 1101 is an area in which the user sets a rule of the file name for the scanned business form. The user can add characters desired to give to the file name by dragging and dropping a button included in button groups 1102 and 1103 to the file name rule-setting area 1101. In a case where a plurality of buttons included in the button groups 1102 and 1103 are dragged and dropped in the file name rule-setting area 1101, each of the plurality of buttons is displayed in the file name rule-setting area 1101 in an order of having been added to the file name. Between two buttons dragged and dropped in the file name rule-setting area 1101, another button can be also dropped.

The button group 1102 indicates information on buttons which are held by the image processing system 1 and can be used for a file name. In the illustrated example in FIG. 11A, the button group 1102 includes a "user name" button, an "MFP name" button, a "date" button, a "time" button, and a "desired character" button.

For example, if the "user name" button is dragged and dropped in the file name rule-setting area 1101, the name of the user who has scanned the business form is added to the file name. Similarly, if the "MFP name" button is dragged and dropped in the file name rule-setting area 1101, the name of the MFP which has been used to scan the business form is added to the file name. Further, if the "date" button and the "time" button are dragged and dropped in the file name rule-setting area 1101, the date on which the business form has been scanned and the hour, minute, and second at which the business form has been scanned are added to the file name, respectively. Further, if the "desired character" button is dragged and dropped in the file name rule-setting area 1101, a text box appears in a position where this button is dropped, and the user can add desired characters to the file name.

Figure 11B:
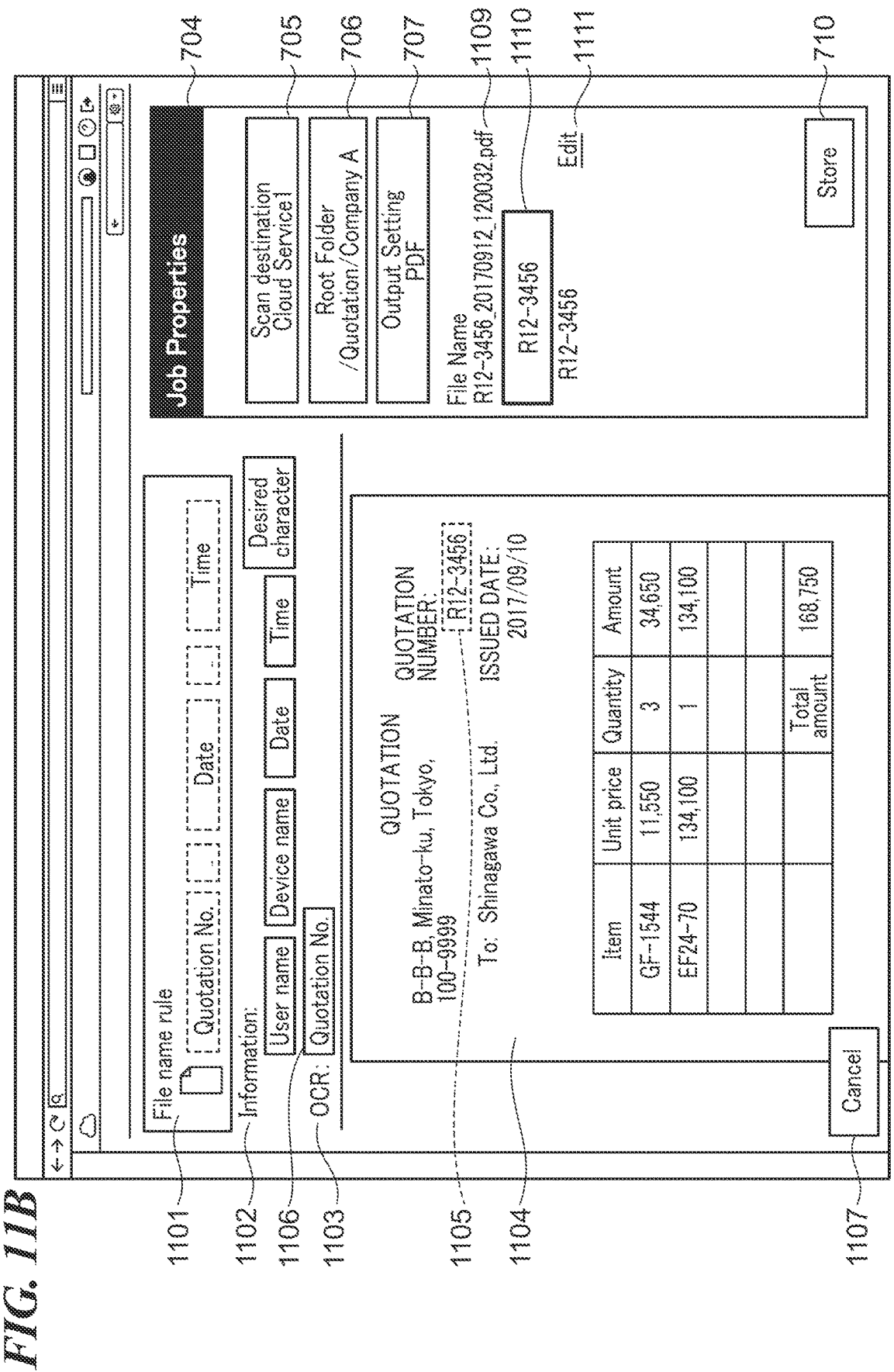
FIG. 11B is a diagram showing an example of a file name edit screen displayed by the client PC in a case where a character string to be used for a file name has been selected from the preview image of the scanned business form.

The button group 1103 indicates definitions of character areas used for a file name. For example, if a "quotation number" button 1106 appearing in FIG. 11B is dragged and dropped in the file name rule-setting area 1101, a character string indicating the contents of the "quotation number" in the scanned business form ("R12-3456" in the present example) is added to the file name.

A preview area 1104 (display unit) is an area for displaying a preview image of a scanned business form. For example, if the user clicks a character area 1105 including the character string "R12-3456" desired to use for a file name or the like on the preview image, a character string associated with the character area 1105 ("quotation number" existing on the left side of the character area 1105 in the present example) is extracted as an item name. After that, a button displaying the extracted item name ("quotation number" button 1106 in the present example) is added to the button group 1103. Note that in a case where a character string associated with a character area clicked on the preview image cannot be extracted, a text box is displayed on a button newly added to the button group 1103 by this clicking. This enables the user to input desired characters and thereby set an item name displayed on the newly added button.

Figure 20:
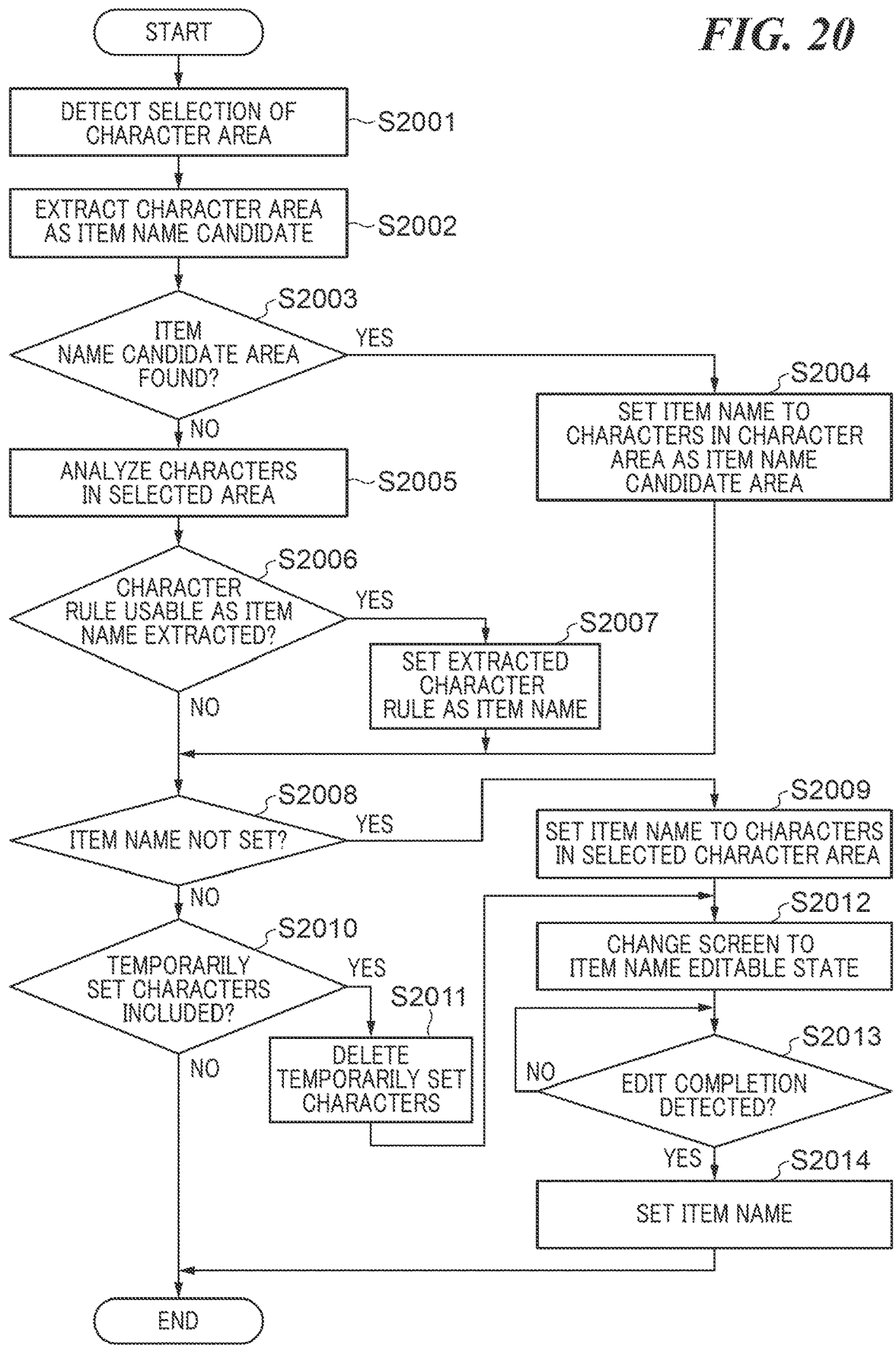
FIG. 20 is a flowchart of a process performed by the image processor and a display controller of the MFP cooperation service, for setting an item name of a character area selected by a user on a preview area of the file name edit screen.

FIG. 20 is a flowchart of a process performed by the image processor 432 and the display controller 435 of the MFP cooperation service 120, for setting an item name of a character area selected by a user on a preview image of the file name edit screen shown in FIG. 11A. Processing steps of the process are realized by the CPU 311 that loads a program stored in the ROM 312 or the HDD 314 of the MFP cooperation service 120 into the RAM 313 and executes the loaded program. Note that the process in FIG. 20 may be executed by the client PC 111.

This process is started in a case where the user selects a character area on a preview image in the preview area 1104 on the file name edit screen shown in FIG. 11A.

First, in a step S2001, when a character area selection detection event generated based on user's selection of a character area on a preview image in the preview area 1104, as a trigger, is detected, the display controller 435 proceeds to a step S2002.

In the step S2002, the image processor 432 (extraction unit) extracts a character area including characters which form an item name (item name candidate area) using the coordinate information of a character area notified together with the character area selection detection event. More specifically, in the present embodiment, a character area existing on the left side of the character area selected by the user is extracted as the item name candidate area.

Next, in a step S2003, the image processor 432 determines whether or not an item name candidate area is found as a result of the extraction in the step S2002. If it is determined in the step S2003 that an item name candidate area is found (YES to the step S2003), the image processor 432 proceeds to a step S2004.

In the step S2004, the image processor 432 (setting unit) sets the character string included in the item name candidate area as the item name. Note that in a case where there is a delimiter, such as a colon, at the end of the character string included in the item name candidate area, the delimiter may be deleted and the characters except the delimiter may be set as the item name. For example, as shown in the file name edit screen shown in FIG. 11B, in a case where the character area 1105 including the character string "R12-3456" on the preview image is selected by the user, an item name candidate area including a character string "quotation number:" existing on the left side of the character area 1105 is extracted. In this case, "quotation number" obtained by deleting the delimiter of ":" is set as the item name, and the "quotation number" button 1106 is added to the button group 1103.

Note that in general, in a case where there is a name of an item, the name often exists on the left side of characters forming the contents of the item, and hence only the left side area of the character area selected by the user is extracted as the item name candidate area, but this is not limitative. For example, in the step S2003, an area around the character area selected by the user, particularly, an area above the selected character area, may be extracted as an item name candidate area. Further, in a case where a character area which is located in the center of upper part of the preview image and is larger in height than other character areas is selected by the user, the character string included in the selected character area may be judged as a document name and be extracted as an item name candidate area. Further, in a case where, judging from information on ruled lines included in the preview image, characters in a character area selected by the user are determined to be characters in a table, if the character area can be recognized as a header portion of the table, the character area may be extracted as an item name candidate area to set the characters in the character area as an item name.

On the other hand, if it is determined in the step S2003 that no item name candidate area is found, the process proceeds to a step S2005.

In the step S2005, the image processor 432 analyzes the characters in the character area selected by the user.

In a step S2006, the image processor 432 determines whether or not a character rule which can be used for the item name can be extracted from the analyzed characters. If it is determined in the step S2006 that a character rule which can be used for the item name can be extracted (YES to the step S2006), the process proceeds to a step S2007, whereas if not, the process proceeds to a step S2008.

In the step S2007, the image processor 432 sets the extracted character rule as the item name. The character rule which can be used for the item name refers e.g. to a character rule which enables determination of a date, such as "four-digit number, slash, two-digit number, slash, and two-digit number". In this case, in the step S2007, the item name is set to "XXX date". Further, in a case where the extracted character rule is a character rule which enables determination of an amount of money, such as a character rule including "¥" at the head of the characters and a value after "¥", the item name is set to "XXX amount" in the step S2007. Further, in a case where the extracted character rule is a character rule which includes "company" in the characters and enables determination of a client company name, the item name is set to "XXX company" in the step S2007. Here, "XXX" part of the "XXX date" is temporarily set characters for information which cannot be identified only from the character rule extracted in the step S2006. These temporarily set characters are characters replaced in steps S2008 to S2013, described hereinafter, in which the user edits the item name.

In a step S2008, the image processor 432 determines whether or not the item name is still in a not-set state. If it is determined in the step S2008 that the item name is still in a not-set state (YES to the step S2008), the process proceeds to a step S2009, whereas if the item name has been set (NO to the step S2008), the process proceeds to a step S2010.

In the step S2009, the image processor 432 directly sets the characters in the character area selected by the user as the item name, and then proceeds to a step S2012.

In the step S2010, the image processor 432 determines whether or not temporarily set characters are included in the set item name. If it is determined in the step S2010 that temporarily set characters are included (YES to the step S2010), the process proceeds to a step S2011, whereas if not (NO to the step S2010), the present process is immediately terminated.

In the step S2011, the display controller 435 deletes the temporarily set characters and proceeds to the step S2012. For example, in a case where the item name is set as "XXX date", "XXX" as the temporarily set characters are deleted, and only "date" remains.

In the step S2012, the display controller 435 displays a text box for a user to input text on the screen to thereby set the item name in an editable state. For example, in a case where the temporarily set characters have been deleted in the step S2011, the focus position of the text box is a position where the temporarily set characters existed. Further, in a case where characters of the character area selected by the user in the step S2009 are set to the item name, the characters in the selected character area are displayed in the text box in a state editable by the user.

In a step S2013, if it is detected that user has terminated inputting of characters in the text box displayed in the step S2012 using e.g. the keyboard, i.e. editing by the user is completed, the display controller 435 proceeds to a step S2014.

In the step S2014, the display controller 435 finally determines the item name and adds a button for displaying the determined item name to the button group 1103, followed by terminating the present process.

Next, a specific example of the process in FIG. 20 will be described with reference to FIG. 21.

When the user selects (clicks) a character area including a character string "Shinagawa Co., Ltd." (character area 2101 appearing in FIG. 21) on the preview image 1104 appearing in FIG. 11A in the step S2001, the item name is set to "XXX company" in the step S2007.

Further, "XXX" as the temporarily set characters are deleted from the set item name "XXX company" in the step S2011. In this case, the focus position of a text box 2102 displayed in the step S2012 is a position where the temporarily set characters existed.

After that, when the user clicks an OK button 2103 without particularly inputting any character in the text box 2102 using the keyboard or the like, the edit operation is completed, and in the step S2014, the item name is finally determined as the "company", and a "company" button is added to the button group 1103.

Although described hereinafter, the location information of a character area of a business form scanned before, including a character string used as its file name (or part of the file name), is stored in a settings information management table (see FIG. 19A) as the settings information of a similar business form to be used next time in the MFP cooperation service 120. With this, from next time, in a case where there is a business form having the same format (similar business form) as a newly scanned business form, a file name can be automatically assigned to the newly scanned business form using the character string of the character area, held in the settings information management table. That is, in the present embodiment, when assigning a file name to a newly scanned business form, the MFP cooperation service 120 performs a rule-based estimation process using the settings information management table as a look-up table (LUT).

The file name edit screen further includes the following buttons:

A cancel button 1107 (see FIG. 11A) is a button for canceling editing and returning the screen to the scanned business form list screen.

The button 710 being displayed as "store" (see FIG. 11A) is a button for storing a file name rule including a selected character area.

A file name 1109 (see FIG. 11B) is an area for displaying a set file name. In the file name 1109, a file name (see FIG. 11B) replaced from the file name of a default value (see FIG. 11A) is displayed according to the rule set by the user in the file name rule-setting area 1101.

An OCR image 1110 displays, in a case where the user drags and drops one of the buttons in the button group 1103 in the file name rule-setting area 1101, an image of character area part selected by the user on the preview image (on which the OCR processing has been performed).

An edit button 1111 is a button for enabling a user, when the user clicks this, to edit characters in the OCR image 1110. This can be used mainly for correcting characters e.g. in a case where the characters are erroneously recognized by character recognition or any unnecessary character is included.

When the user clicks the button 710 being displayed as "store", the process proceeds to a step S532 (see FIG. 5B).

In the step S532, the client PC 111 transmits information of the file name, the file name rule, and the character area used for the file name, displayed on the file name edit screen when the button 710 being displayed as "store" has been clicked, to the MFP cooperation service 120. In the following description, the information of the file name, the file name rule, and the character area used for the file name is referred to as the file name-associated information.

In a step S533, the MFP cooperation service 120 stores the file name-associated information of the scanned business form selected by the user.

Further, in a step S534, the MFP cooperation service 120 stores the settings information, such as the transmission destination, the transmission destination folder, the output setting, the file name rule, and the character area used for the file name, stored in the steps S523, S527, S530, and S533. At this time, this settings information is stored in a state associated with a business form ID (described in detail hereinafter) uniquely representing a type of a scanned business form and the user name of the user identified by the access token. That is, a settings information management table (described in detail hereinafter) shown in FIG. 19A is generated or updated.

Note that although in the present embodiment, the settings information is stored in the step S534, this is not limitative. For example, the settings information may be stored when the user clicks the button 710 being displayed as "store" on the scanned business form list screen (see FIG. 7).

Further, in the present embodiment, the settings information is associated not only with the business form ID, but also with the user name because a case is assumed where the file name and the transmission destination to be stored are different for each user. However, the storing method is not necessarily required to be limited to the present embodiment, but the settings information may be associated only with the business form ID or may be associated with other information, or information to be associated with the settings information may be configured such that it can be set. The information stored in a state associated with the business form ID and the user name is used such that in a case where a business form scanned next time or thereafter is determined as a business form of the same type in the similar business form determination, the settings stored this time are automatically given to the business form of the same type, and hence it is possible to reduce the troublesome work of the same user for setting the same settings for business forms of the same type a lot of times. Further, when the settings information is stored in the step S534, if information of the same form ID as that of the information to be stored this time has already been stored in the MFP cooperation service 120, the settings information is overwritten by the settings information stored this time. The user may be requested each time to confirm whether or not to overwrite the settings information.

Steps S535 to S540 are processing operations executed in a case where the cloud storage 130 storing metadata is set as the transmission destination of the information on the scanned business form.

When storing of the transmission destination in the step S523 and storing of the transmission destination folder in the step S527 are executed, the button 710 being displayed as "store" is shifted to the enabled state on the scanned business form list screen shown in FIG. 7. When the user clicks the button 710 being displayed as "store" in the enabled state, the process proceeds to a step S535.

In the step S535, the client PC 111 requests the MFP cooperation service 120 to transmit metadata.

In the step S536, the MFP cooperation service 120 requests the clout storage 130 selected by the user as the transmission destination to transmit metadata in the transmission destination folder selected by the user. The cloud storage 130 having received this request transmits metadata information set in the transmission destination folder selected by the user to the MFP cooperation service 120. Upon receipt of the metadata information from the cloud storage 130, the MFP cooperation service 120 transmits image information necessary for displaying the received metadata information to the client PC 111. Upon receipt of the image information from the MFP cooperation service 120, the client PC 111 displays the received metadata information in the job properties area 704 on the scanned business form list screen.

Figure 12:
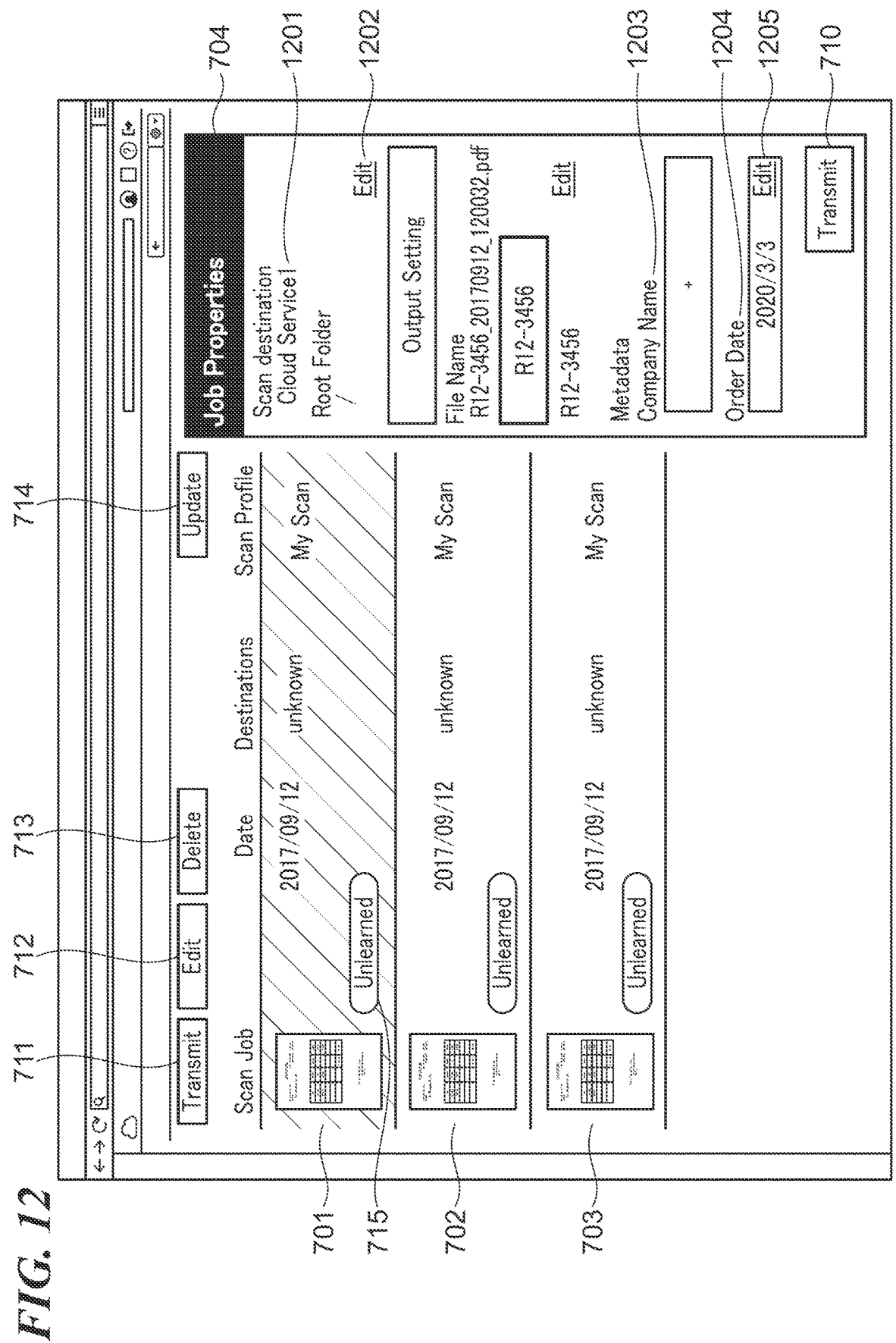
FIG. 12 is a diagram showing an example of a job properties area displayed by the client PC, in which metadata information is displayed.

FIG. 12 shows an example of the job properties area 704 displayed by the client PC 111, in which the metadata information is displayed.

Here, the button 710 is changed in display name from "store" to "transmit".

A setting display section 1201 displays, in an area where the transmission destination-setting button 705 and the transmission destination folder-setting button 706 were displayed, only the settings of the transmission destination and the transmission destination folder in place of these buttons 705 and 706. This is to prevent the user from easily changing the transmission destination and the transmission destination folder after the metadata information is displayed on the scanned business form list screen.

An edit button 1202 is a button used in a case where the cloud storage 130 as the transmission destination and the transmission destination folder are edited. When the edit button 1202 is clicked, the client PC 111 displays a confirmation message screen notifying that the metadata displayed in FIG. 12 is cleared, on the display. When the user confirms that there is no problem in clearing the metadata, the display of the setting display section 1201 is returned to the display of the transmission destination-setting button 705 and the transmission destination folder-setting button 706, whereby the transmission destination and the transmission destination folder can be set again. At this time, the display name of the button 710 is returned from "transmit" to "store" again. Details of this processing will be described hereinafter with reference to FIG. 17.

Metadata 1203 and metadata 1204 are metadata having been set for the transmission destination folder selected by the user.

Figure 22:
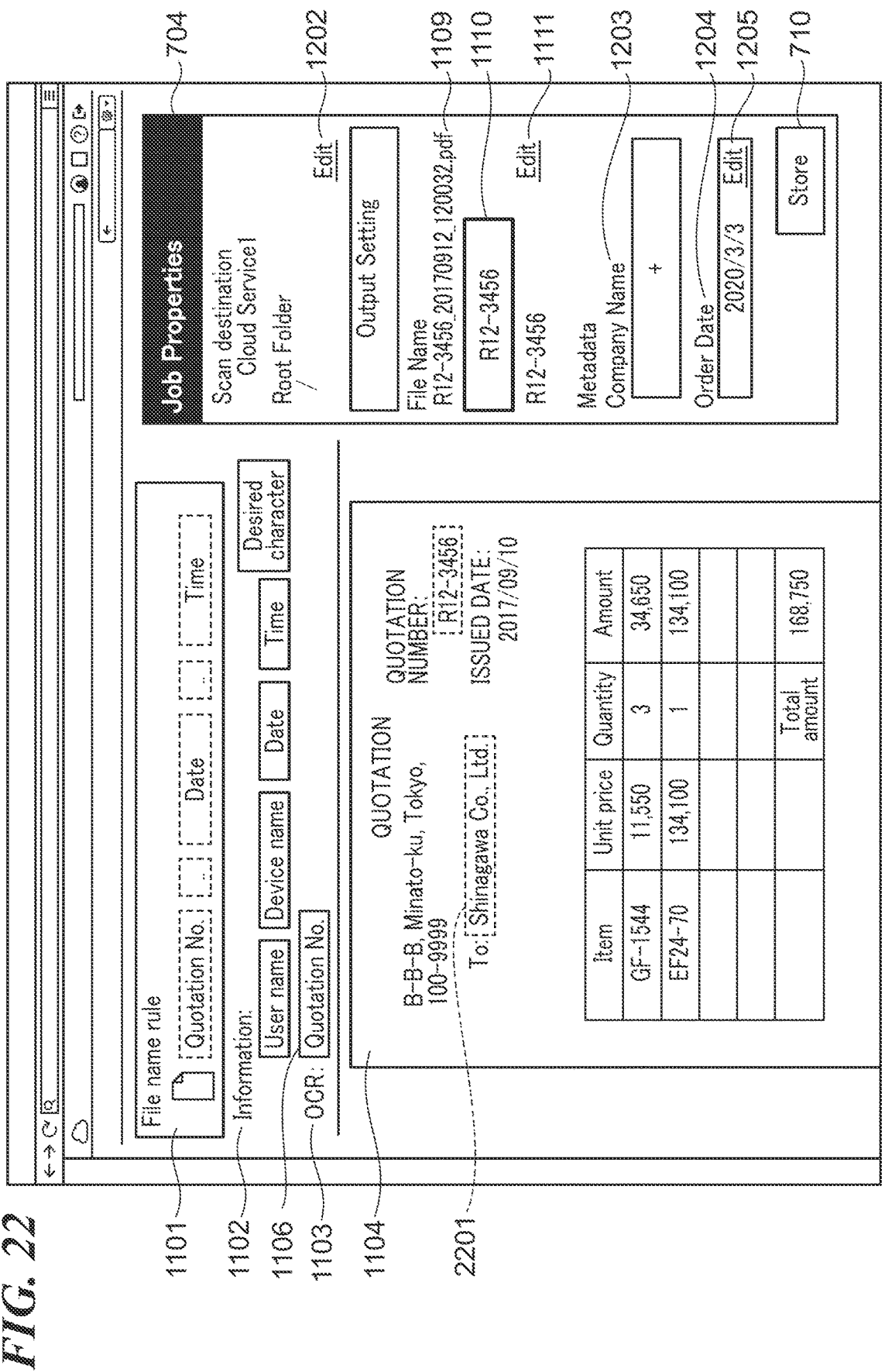
FIG. 22 is a diagram showing a metadata edit screen displayed by the client PC.

The metadata 1203 is an example of metadata to which a company name is input. The user may select a character area including a desired character string on the preview image of the scanned business form 701 on a metadata edit screen (see FIG. 22), described hereinafter, which is displayed by clicking the edit button 712, similarly to the case of editing a file name. In this case, the character string included in the character area selected by the user is input to the metadata 1203. Details of this processing will be described hereinafter as a step S537 et seq. in FIG. 5B.

The metadata 1204 is an example of metadata to which a date is input. The user can designate a date to be input to the metadata 1204 using a calendar displayed by clicking an edit button 1205.

The value and the type of the metadata set to the transmission destination folder selected by the user depend on the cloud storage 130 as the transmission destination selected by the user, and hence the metadata information displayed in the job properties area 704 is not limited to the metadata 1203 and the metadata 1204.

When the user clicks the edit button 712 to select a character string to be input to the metadata 1203 from the preview image of the scanned business form 701, the process proceeds to the step S537 (see FIG. 5B).

In the step S537, the client PC 111 requests the MFP cooperation service 120 to transmit information of the metadata edit screen. In response to this request, the MFP cooperation service 120 transmits screen information necessary for displaying the metadata edit screen, including a preview image of the scanned business form, coordinates of character areas, and character recognition results. Upon receipt of this screen information from the MFP cooperation service 120, the client PC 111 displays the metadata edit screen (see FIG. 22) on the display based on the received screen information.

When the user selects a character area including a desired character string (character area 2201 in the present example) from the preview image on the metadata edit screen, and clicks the button 710 of which the display name is set to "store" in the job properties area 704, the process proceeds to a step S538.

In the step S538, the client PC 111 transmits the character string included in the character area 2201 to the MFP cooperation service 120 as the metadata information.

In a step S539, the MFP cooperation service 120 stores the metadata information transmitted from the client PC 111 in a state associated with the scanned business form selected by the user.

Further, in a step S540, the MFP cooperation service 120 stores the changed settings information in a state associated with the business form ID and the user name. After that, the MFP cooperation service 120 transmits screen information necessary for displaying the screen on which the settings information has been updated, to the client PC 111. Upon receipt of this screen information from the MFP cooperation service 120, the client PC 111 displays the scanned business form list screen on the display based on the received screen information. On this scanned business form list screen, the button 710 is displayed as "transmit".

After that, when the user clicks the button 710 on the scanned business form list screen of the client PC 111, the process proceeds to a step S541.

In the step S541, the client PC 111 requests the MFP cooperation service 120 to transmit a file of the scanned business form selected by the user to the output folder of the transmission destination selected by the user.

The MFP cooperation service 120 executes file transmission processing in response to this transmission request.

First, in a step S542, the MFP cooperation service 120 generates a file using the set output setting and file name.

Next, in a step S543, if there is a changed setting, the MFP cooperation service 120 stores this change in a state associated with the business form ID and the user.

Finally, in a step S544, the MFP cooperation service 120 transmits the generated file to the set transmission destination folder of the cloud storage 130 which is the set transmission destination, after attaching the input metadata to the file. After that, when this transmission processing is completed, the MFP cooperation service 120 notifies the client PC 111 of completion of transmission, and proceeds to a step S545.

Upon receipt of this notification from the MFP cooperation service 120, the client PC 111 notifies the user of completion of transmission and deletes the scanned business form which has been transmitted from the scanned business form list screen.

In the step S545, the MFP cooperation service 120 (third default value-setting unit) stores the cloud storage 130 as the transmission destination and the output setting, out of the settings information set this time, as the default values set by the user. Then, the information stored in the step S545 is used as the settings for a scanned business form having no similar business form, next time and thereafter. The cloud storage 130 as the transmission destination and the output setting are assumed to be rarely changed even when the type of a business form is different, and hence by setting the default values as mentioned above, it is possible to reduce the load on the user in performing setting for a business form having no similar business form. Hereafter, each process will be described in detail.

FIGS. 19A and 19B each show the settings information management table held by the data management section 434 (first holding unit, second holding unit, and holding unit) of the MFP cooperation service 120.

The settings information management tables shown in FIGS. 19A and 19B are tables for holding the settings information including the cloud storage 130 as the transmission destination and the transmission destination folder, set for a paper business form scanned by the user using the MFP 110, for each type of the business form.

Here, the management form of the settings information in the MFP cooperation service 120 is different between a case where the scan button 601 (see FIG. 6A) as the no settings-associated button is selected and a case where one of the scan buttons 602 and 603 (see FIG. 6A) as the settings-associated buttons is selected.

FIG. 19A shows a settings information management table 1910 as an example of the settings information management table generated in a case where the no settings-associated button (scan button 601) is selected on the scan button selection screen shown in FIG. 6A.

In the settings information management table 1910, the settings information is held in a state associated with the business form ID uniquely indicating the user name and the business form type. For example, for a user name "user A", the settings information items associated with two form IDs 1911 and 1912 are held in the settings information management table 1910.

A column 1901 indicates user names associated with the settings information management table 1910.

A column 1902 indicates business form IDs each uniquely indicating a type of a business form.

A column 1903 indicates names of the cloud storages 130 as transmission destinations set by the user in the past for respective business forms associated with the business form IDs.

A column 1904 indicates paths of transmission destination folders set by the user in the past for respective business forms associated with the business form IDs.

A column 1905 indicates output settings set by the user in the past for respective business forms associated with the business form IDs.

A column 1906 indicates file name rules set by the user in the past for respective business forms associated with the business form IDs.

Columns 1907a to 1907c each indicate, with respect to a character string in a character area selected by the user in the past from a preview image of a business form associated with a business form ID, out of the character strings used for the file name, an item name and location information (width, height, and coordinates) of the character area. For example, a cell 1907a1 holds "quotation number" which is the item name of the character string "R12-3456" included in the character area 1105 in FIG. 11B and the location information (10, 20, 5, 10) of the character area 1105. Note that although in the present example, the three columns 1907a to 1907c are set in the settings information management table 1910, more columns are set depending on a file name rule.

Columns 1908a to 1908e each indicate information of the metadata. Note that for metadata formed by a character string in a character area selected by the user in the past from the preview image of a business form associated with a business form ID, the location information (coordinates) of the selected character area is indicated. For example, in a cell 1908a1, the location information (20, 30, 5, 20) of the character area 2201 is held as the metadata with respect to the character string "Shinagawa Co., Ltd.," included in the character area 2201 selected by the user from the preview image appearing in FIG. 22. Note that although in the present example, the five columns 1908a to 1908e are provided in the settings information management table 1910, more columns are provided depending on the metadata information.

Let it be assumed that the user A has newly scanned a paper business form similar to the business form having the business form ID: "aaaaaaaa-ffff-49ab-acf8-55558888eeee", using the MFP 110. In this case, the settings information including the name of the cloud storage as the transmission destination, indicated as data in the first row of the settings information management table 1910, is reflected on the settings for the newly scanned paper business form.

The settings information management table 1910 is updated whenever the user A scans a paper business form using the MFP 110, selects the scan button 601 as the no settings-associated button on the scan button selection screen shown in FIG. 6A, and then changes the settings information.

FIG. 19B shows a settings information management table 1920 as an example of the settings information management table generated in a case where a settings-associated button (scan button 602 or 603) is selected on the scan button selection screen shown in FIG. 6A.

Differently from the settings information management table 1910, in the settings information management table 1920, a button ID 1921 of the settings-associated button is added in place of the user name. That is, the settings information management table 1920 is not associated with a user, and is updated when any user who has selected the settings-associated button has changed the settings information of a newly scanned paper business form.

In the present embodiment, settings information associated with a business form ID is defined by only one row, and whenever the user changes the settings information of a newly scanned paper business form, the settings information management table 1920 is updated. That is, the user can reflect the latest settings information held in the settings information management table 1920 on the settings information of a newly scanned paper business form.

Note that the settings information associated with a business form ID is not necessarily required to be defined in one row, but the settings information associated with the business form ID may be newly added whenever the user changes the settings information of the newly scanned paper business form. Further, the user may determine settings information to be reflected as the default values of the settings information of the newly scanned paper business form, based e.g. on the use frequency of the settings information.

Figure 13:
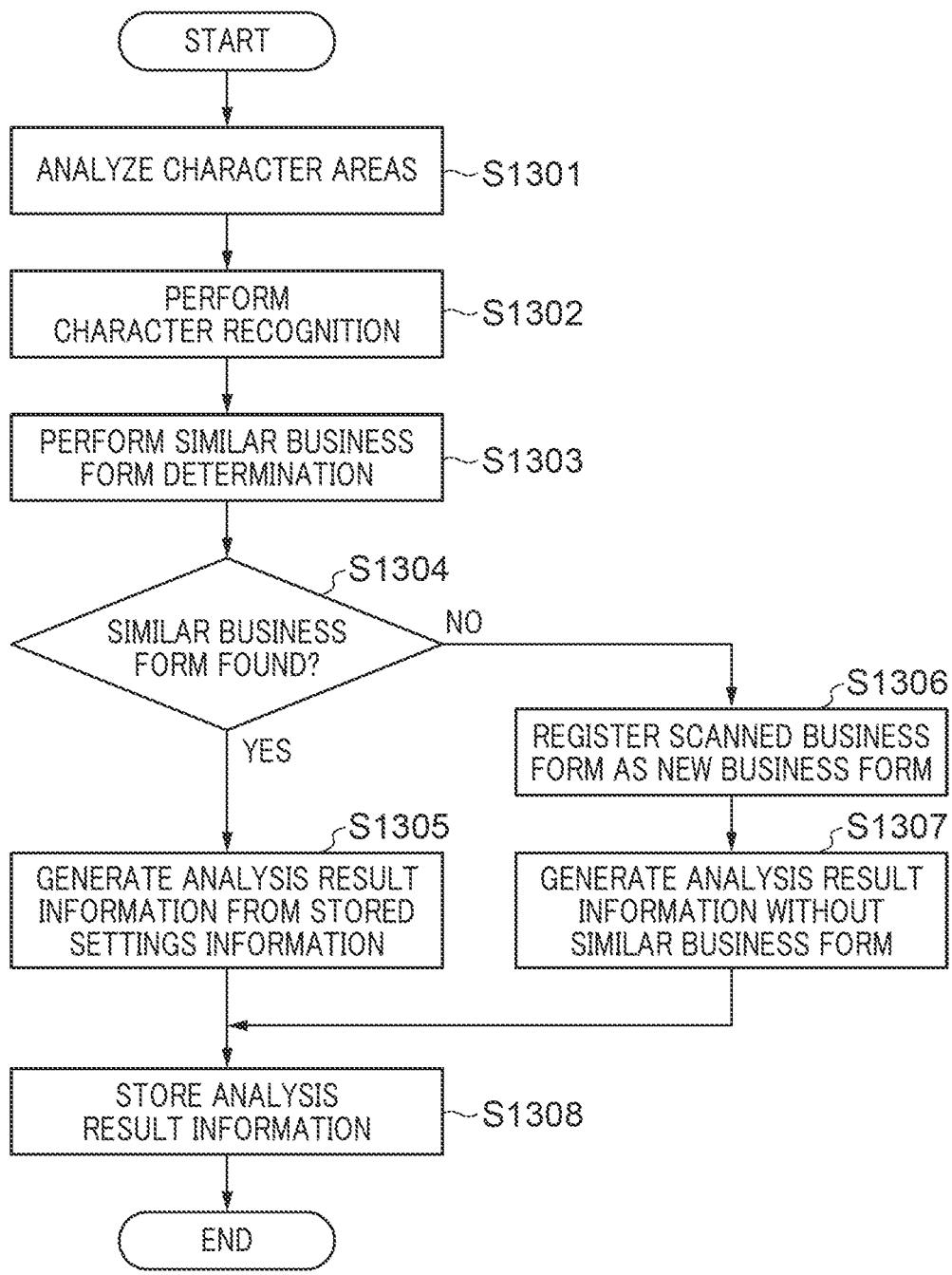
FIG. 13 is a flowchart of an image analysis process performed by an image processor of the MFP cooperation service.

FIG. 13 is a flowchart of the image analysis process performed by the image processor 432 of the MFP cooperation service 120. The processing steps are realized by the CPU 311 that loads a program stored in the ROM 312 or the HDD 314 of the MFP cooperation service 120 into the RAM 313 and executes the loaded program. Note that the present flowchart shows details of the steps S514 to S516 executed by the image processor 432 after receiving an image processing request (scanned image analysis request) from the request controller 431 of the MFP cooperation service 120 in the step S512 in FIG. 5A. As descried above, the image of the business form scanned by the MFP 110 this time is also transmitted to the image processor 432 together with the image processing request.

First, in a step S1301, the image processor 432 analyzes character areas of the current scanned business form image and acquires the location information of a group of character areas in the business form.

Then, in a step S1302, the image processor 432 performs the character recognition processing on all the character areas whose location information has been acquired in the step S1301. With this, the character information in each character area is acquired.

In a step S1303, the image processor 432 performs the similar business form determination using the location information acquired in the step S1301. In the similar business form determination, the location information of business form images scanned before and the location information of the current scanned business form image are compared, and if the business form images scanned before include a business form image having location information similar to that of the current scanned business form image, this business form image is determined as an image of the similar business form.

If it is determined in a step S1304, as the result of the determination in the step S1303, that a similar business form is found (YES to the step S1304), the process proceeds to a step S1305. In this case, the business form ID associated with the settings information of the current scanned business form image in the step S534 is set to the business form ID of the similar business form.

In the step S1305, the image processor 432 generates analysis result information based on the settings information stored in a state associated with the similar business form (i.e. the settings information stored in the state associated with the business form ID e.g. in the step S534). The analysis result information refers to information including the cloud storage 130 as the transmission destination, the file name rule of the similar business form, and so forth, which are set for the similar business form. In a case where an item name is used for the file name in the similar business form, first, the location information of a character area including the character string indicating the contents of the item name is acquired from the image of the similar business form. Then, a character area having the same location information is detected from the current scanned business form image, and a character string in the detected character area is also acquired as information forming the analysis result information.

If it is determined in the step S1303 that no similar business form is found (NO to the step S1304), the process proceeds to a step S1306.

In the step S1306, the image processor 432 associates the location information of all character areas of the current scanned business form image, acquired in the step S1301, with a new form ID, and newly registers the location information as the information of the new business form (i.e. the business form having no similar business form). The information newly registered in this step is used as the location information of the business form image scanned before, which is to be used in the similar business form determination when the image analysis process in FIG. 13 is performed next time and thereafter.

In a step S1307, the image processor 432 generates the analysis result information. Here, since there is no similar business form, a character string to be set as the file name and the like are not acquired.

In a step S1308, the image processor 432 stores the analysis result information generated in the step S1305 or S1307 in the HDD 314 of the MFP cooperation service 120, followed by terminating the present process.

FIG. 14 is a diagram showing an example of a table showing the analysis result information stored in the HDD 314 of the MFP cooperation service 120.

A column 1404 stores values each indicating whether or not a business form similar to the current scanned business form image to be analyzed is included in the business form images scanned before, by the similar business form determination in the step S1303. If a similar business form is found, a value of "TRUE" is stored, whereas if not, a value of "FALSE" is stored. The determination of whether the value is "TRUE" or "FALSE" is performed based on a matching degree (expressed by a real value from 0 to 1) between the location information of an image scanned in the past and the location information of the present scanned image. As the matching degree is higher, the business form is more similar, and in a case where the matching degree exceeds a predetermined threshold value, it is determined that a similar business form is found ("TRUE").

A column 1405 stores values each uniquely indicating a type of a business form. The same form ID is assigned to similar business forms.

To a column 1406, in a case where a similar business form is found in the step S1304, a name of the cloud storage 130 as the transmission destination, set for the similar business form scanned in the past, is added.

To a column 1407, in a case where a similar business form is found in the step S1304, a path of the transmission destination folder, set for the similar business form scanned in the past, is added. This path uniquely indicates a folder as a storage destination in the cloud storage 130 as the transmission destination stored in the column 1406, and is expressed in a form which makes it possible to recognize the target cloud storage 130, such as a URL.

To a column 1408, in a case where a similar business form is found in the step S1304, an output setting set for the similar business form scanned in the past is added.

To a column 1409, in a case where a similar business form is found in the step S1304, a file name rule set for the similar business form scanned in the past is added.

To a column 1410 ("ocr1"), in a case where a similar business form is found in the step S1304 and the file name rule includes an item name, a character string in a character area of the current scanned business form image, corresponding to the character area including the character string indicating the contents of the item name in the similar business form scanned in the past, is added. That is, the character string in the column 1410 is set as the default value of the file name of the present scanned business form (first default value-setting unit). Although not shown, the analysis result information includes the coordinates, the width, and the height of each character area, and the character string in each character area of the current scanned business form image, and whether or not a character area corresponds to a character area of the similar business form scanned in the past is determined by comparing the analysis result information with the information of the character areas of the similar business form scanned in the past. In a case where the file name rule includes a plurality of item names, information is added for each of the plurality of item names, such as a column 1411 ("ocr 2") and a column 1412 ("ocr 3").

A column 1413 is added in a case where a similar business form is found in the step S1304, the set transmission destination is the cloud storage 130 storing metadata, and at the same time there is metadata set for the similar business form in the past. In a case where a character string in a character area selected by the user on the preview image is used for the metadata in the similar business form, if it is determined that the current scanned business form image includes the corresponding character area, the character string in the corresponding character area is added to the column 1413. That is, the character string in the column 1413 is set as the default value of the metadata of the present scanned business form (operation of a second default value-setting unit).

A row 1401 shows an example of the analysis result information in a case where a similar business form is found in the step S1304, and the set transmission destination is the cloud storage 130 not storing metadata. In the row 1401, the cloud storage 130 as the transmission destination set for the similar business form is set in the column 1406 thereof and the output information is set in the column 1408 thereof.

A row 1402 shows an example of part of the analysis result information in a case where a similar business form is found in the step S1304, and the set transmission destination is the cloud storage 130 storing metadata.

A row 1403 shows an example of part of the analysis result information in a case where no similar business form is found in the step S1304.

As is clear from the rows 1401 and 1402, in the case where a similar business form is found, the business form ID of the found similar business form is added to its column 1405, and further, the settings and the input information stored in the past for the similar business form (shown in the settings information management table in FIG. 19A) are added. The default values of the job properties information of the present scanned business form are set based on this analysis result information.

On the other hand, as is clear from the row 1403, in the case where no similar business form is found, since there are no past settings and input information, a new form ID is added to its column 1405. Further, the default values held by the MFP cooperation service 120, described hereinafter, are set as the job properties information of the present scanned business form.

Figure 15:
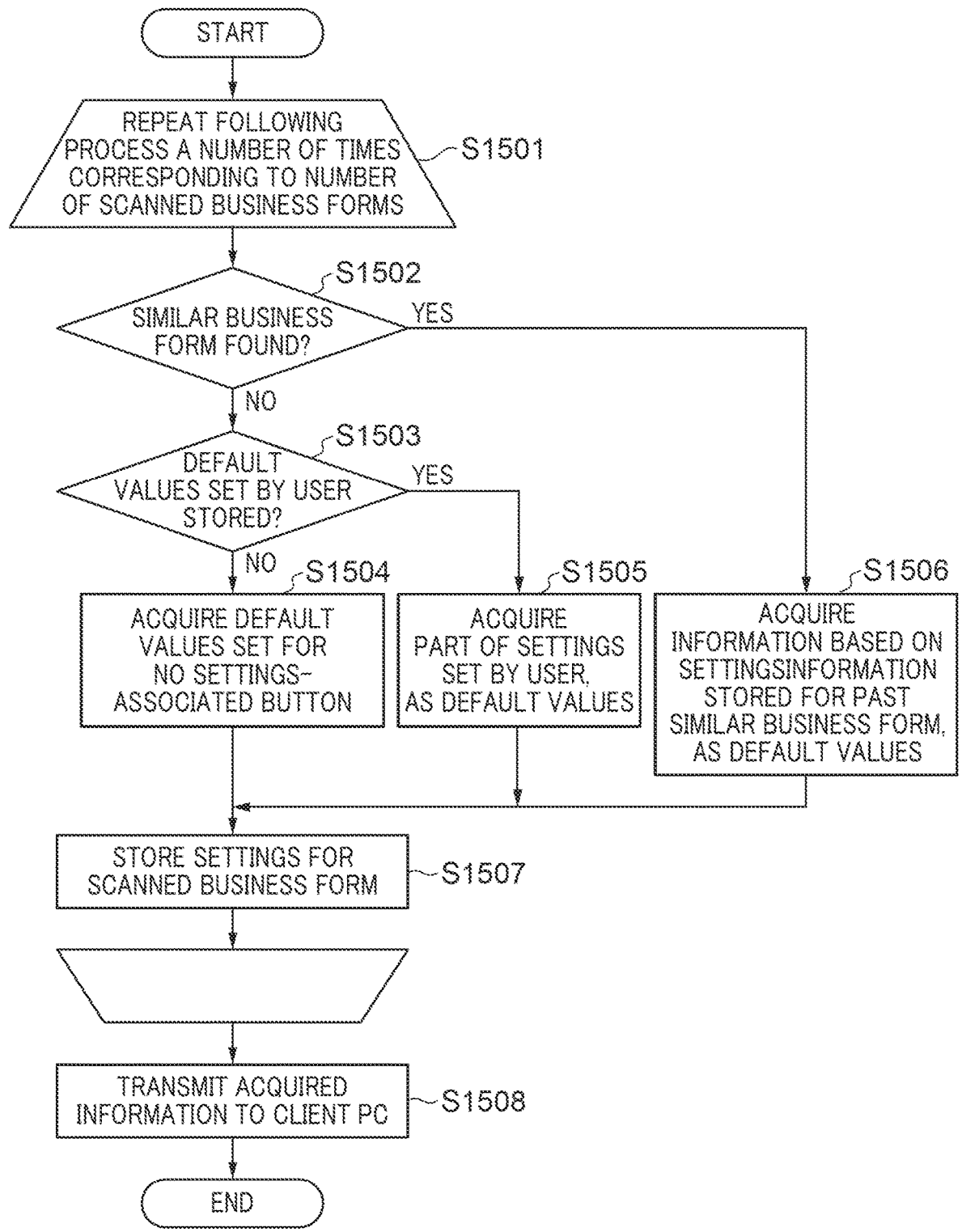
FIG. 15 is a flowchart of a process performed by the MFP cooperation service when the scanned business form list screen is requested to be transmitted in a step in FIG. 5B.

FIG. 15 is a flowchart of a process performed by the MFP cooperation service 120 when the scanned business form list screen information is requested from the client PC 111 in the step S519 in FIG. 5B. The present process is realized by the CPU 311 that loads a program stored in the ROM 312 or the HDD 314 of the MFP cooperation service 120 into the RAM 313 and executes the loaded program. When the MFP cooperation service 120 receives the scanned business form list screen request from the client PC 111 in the step S519, the MFP cooperation service 120 refers to all scanned business forms held in the MFP cooperation service 120 at present and the analysis result information of each scanned business form. The information referred to here is information associated with a user authenticated by the MFP cooperation service 120.

First, as indicated in a step S1501, this process is repeated the number of times corresponding to the number of scanned business forms held in the MFP cooperation service 120.

In a step S1502, the display controller 435 determines whether or not there is a similar business to a scanned business form as the target for the current processing. More specifically, if the value of the column 1404 of the analysis result information (see FIG. 14) associated with the business form ID of the scanned business form as the target for the current processing is "TRUE", it is determined that there is a similar business form, and the process proceeds to a step S1506. On the other hand, if the value of the column 1404 is "FALSE", it is determined that there is no similar business form, and the process proceeds to a step S1503.

In the step S1503, the display controller 435 determines whether or not default values set by the user are stored. Note that if the user transmitted a scanned business form to the cloud storage 130 before at least once, part of the settings information was stored as the default values set by the user in the latest execution of the step S545. Therefore, in a case where the scanned business form is transmitted for the first time, it is determined that no default values set by the user are stored (NO to the step S1503), so that the display controller 435 proceeds to a step S1504 to acquire default values set for the no settings-associated button, and then proceeds to a step S1507. More specifically, as the default values for the no settings-associated button, only the default value of the output setting exists.

On the other hand, in a case where the user transmitted a scanned business form to the cloud storage 130 in the past, it is determined that the default values set by the user are stored (YES to the step S1503), and the process proceeds to a step S1505.

In the step S1505, the display controller 435 acquires the cloud storage 130 as the transmission destination and the output setting, which are the default values set by the user, out of the settings information set in the latest execution of step S543, as the default values. Note that the settings information other than these is not acquired as the default values.

In the step S1506, the display controller 435 acquires the settings acquired from the analysis result information as the default values for the scanned business form. Although not shown in FIG. 5B or FIG. 15, in a case where a default value of the cloud storage 130 is stored as the metadata, or in a case where information which can be referred to by the MFP cooperation service 120 is additionally set such that the information is input, this information is also acquired as default values for the scanned business form.

Note that in a case where the cloud storage 130 as the transmission destination cannot be accessed, or in a case where the transmission destination folder is not found, an error notification may be transmitted to the client PC 111 without acquiring the default values in the steps S1505 and 1506.

In the step S1507, the default value(s) acquired in one of the steps S1504, S1505, and S1506 is/are stored as the settings of the scanned business form as the target for the current processing.

When the steps S1502 to S1507 are completed with respect to all scanned business forms, the process proceeds to a step S1508 to transmit the information including the settings stored with respect to each scanned business form to the client PC 111, followed by terminating the present process.

In a case where the button 710 being displayed as "store" on the scanned business form list screen (see FIG. 7) or the file name edit screen (see FIG. 11B) is clicked, the settings information set for the scanned business form is stored according to the contents of the setting change. At this time, the settings information for the similar business form is also stored. That is, the information in the settings information management table shown in FIG. 19A is updated, and the information in the updated settings information management table is reflected on the settings information of a scanned business form having a similar business form next time and thereafter.

Figure 16:
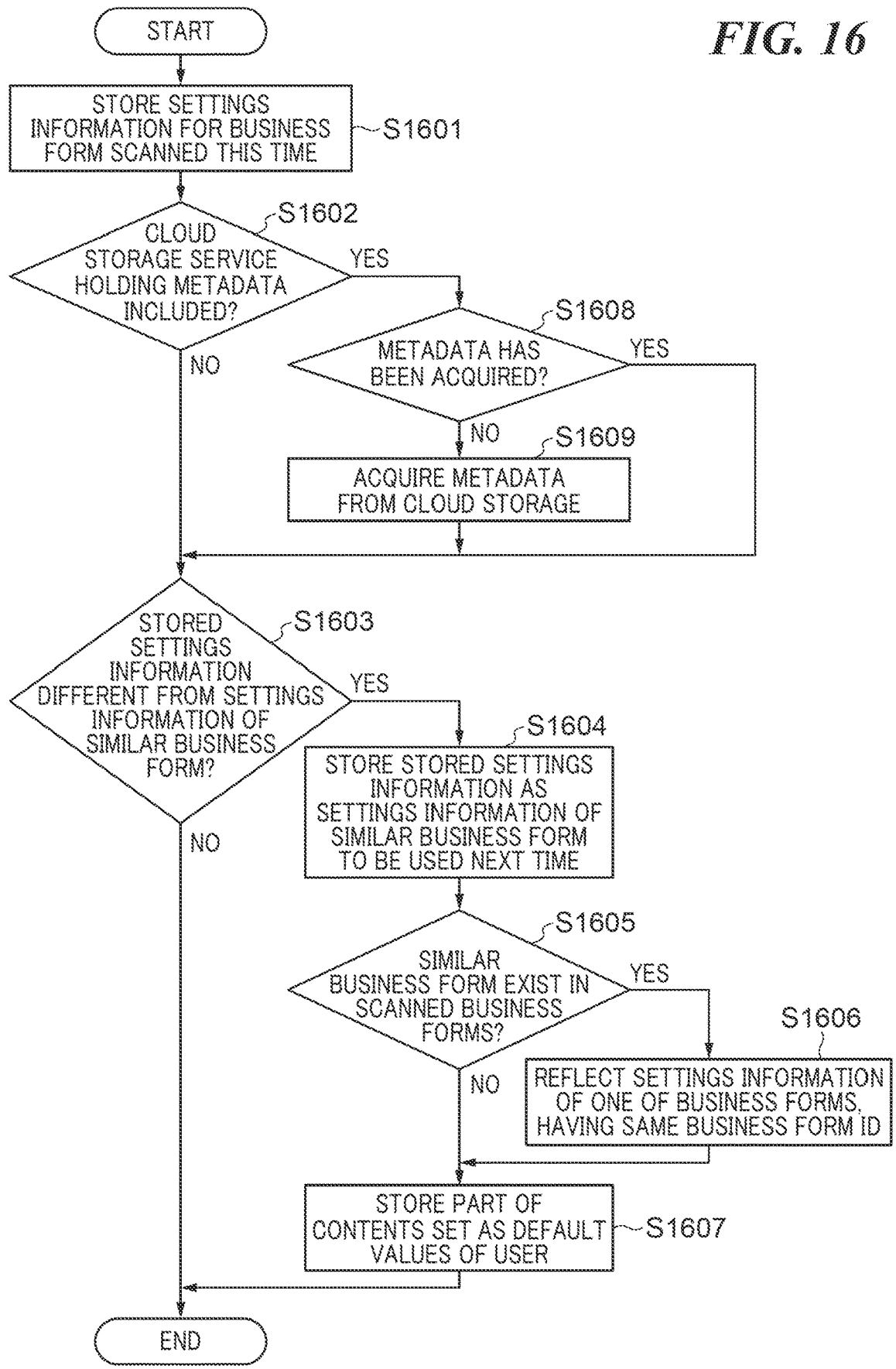
FIG. 16 is a flowchart of a process performed by the MFP cooperation service, for storing settings for a scanned business form.

FIG. 16 is a flowchart of a process performed by the MFP cooperation service 120, for storing the settings for a scanned business form. The processing steps are realized by the CPU 311 that loads a program stored in the ROM 312 or the HDD 314 of the MFP cooperation service 120 into the RAM 313 and executes the loaded program. Note that in the process in FIG. 16, the button 710 (in FIG. 7 and FIG. 11B) is referred to as the storage button.

The present process is started when the storage button is clicked by the user on the client PC 111.

First, in a step S1601, the settings information for a scanned business form is stored.

In a step S1602, the CPU 311 determines whether or not information indicating the cloud storage 130 storing metadata is included in the settings information stored in the step S1601. If it is determined in the step S1602 that information indicating the cloud storage 130 storing metadata is not included (NO to the step S1602), the process proceeds to a step S1603, whereas if information indicating the cloud storage 130 storing metadata is included (YES to the step S1602), the process proceeds to a step S1608.

In the step S1608, the CPU 311 determines whether or not the metadata has been acquired. If it is determined in the step S1608 that the metadata has not been acquired (NO to the step S1608), the metadata is acquired from the cloud storage 130 as the transmission destination in a step S1609, and then the process proceeds to the step S1603. On the other hand, if the metadata has been acquired (YES to the step S1608), the process directly proceeds to the step S1603. Here, in the case where the metadata is acquired in the step S1609, and in the case where the metadata has already been acquired and the process proceeds directly to the step S1603, the same processing is performed in the step S1603 et seq. However, in the case where the metadata is acquired in the step S1609, processing for the acquired metadata is added to the processing in a step S1604 et seq. The processing described here corresponds to the steps S533 and S534 executed according to the step 532, the step S536 executed according to the step S535, and the steps S539 and S540 executed according to the step S538, in FIG. 5B.

In the step S1603, the CPU 311 determines whether or not the settings information stored for the present scanned business form is different from the settings information of a similar business form held in the settings information management table (see FIG. 19A). That is, the CPU 311 determines whether or not the default values of the settings information of the present scanned business form have been changed by the user on the client PC 111. If it is determined in the step S1603 that the settings information is the same as the settings information of the similar business form (NO to the step S1603), the present process is immediately terminated, whereas if the settings information is different from the settings information of the similar business form, the process proceeds to the step S1604.

In the step S1604, the settings information stored for the present scanned business form in the step S1601 is stored as the settings information of a similar business form for use next time. That is, the settings information management table shown in FIG. 19A is updated. The updated settings information items are the cloud storage 130 as the transmission destination, the transmission destination folder, the output setting, the character area used for the file name, and so forth, which are associated with the business form ID of the present scanned business form.

Next, in a step S1605, the CPU 311 determines whether or not a business form similar to the present scanned business form is included in the scanned business form list held by the MFP cooperation service 120 at present. If it is determined in the step S1605 that there is no similar business form (NO to the step S1605), the process proceeds to a step S1607. On the other hand, if there is a similar business form (YES to the step S1605), the process proceeds to a step S1606.

In the step S1606, the contents of the settings information management table updated in the step S1604 are reflected on the settings information of a business form of the same business form ID as the present scanned business form, out of the scanned business forms held at present.

In the step S1607, the information of the cloud storage 130 as the transmission destination and the output setting out of the settings of the scanned business form, set this time, is stored as the default values set by the user, followed by terminating the present process. The default values set by the user are stored in association with the user, and are used as the default values of a scanned business form which is scanned by clicking the no settings-associated button and determined as a business form having no similar business form, next time and thereafter.

Figure 17:
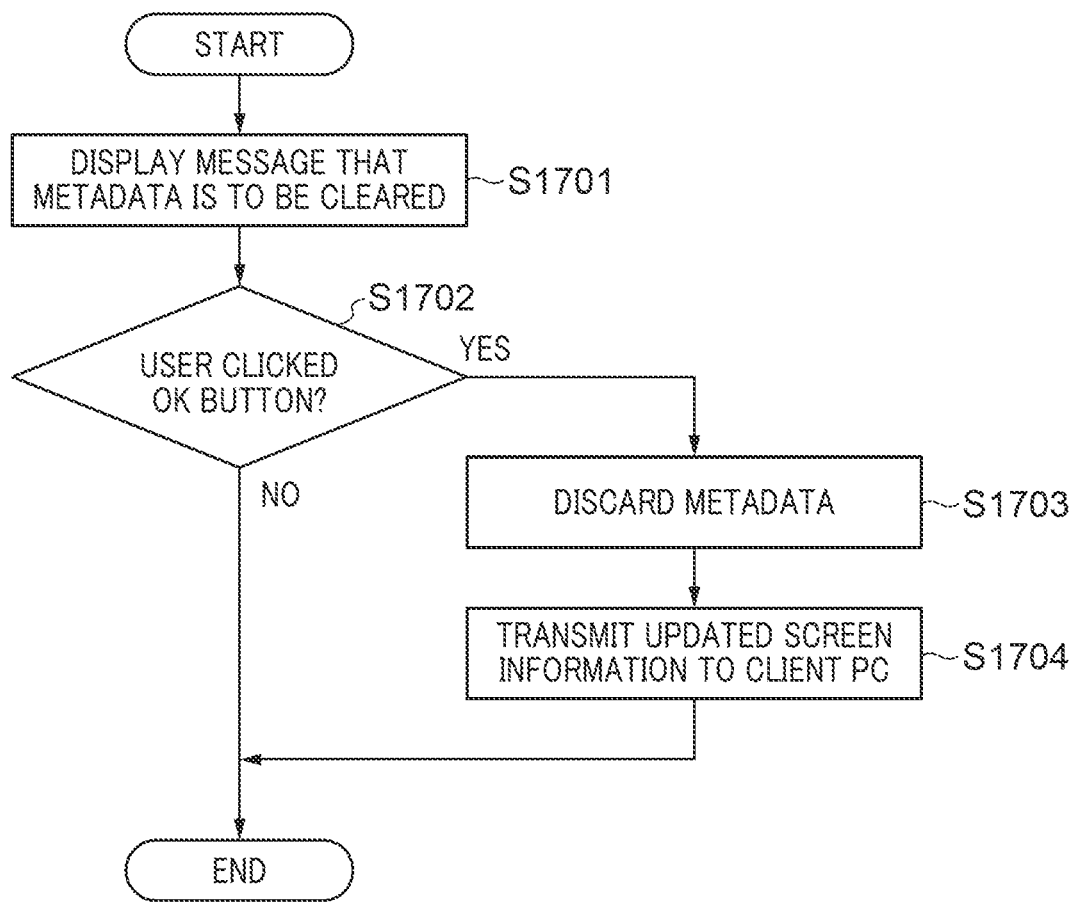
FIG. 17 is a flowchart of a process performed by the MFP cooperation service in a case where an edit button on the job properties area, appearing in FIG. 12, is clicked.

FIG. 17 is a flowchart of a process performed by the MFP cooperation service 120 in a case where the edit button 1202 on the job properties area 704, appearing in FIG. 12, is clicked.

The present process is started when it is detected by the display controller 421 that the user has clicked the edit button 1202 in order to change the cloud storage 130 as the transmission destination and the transmission destination folder.

First, in a step S1701, the display controller 421 displays screen information of the confirmation message screen (not shown) for a user to confirm whether or not there is a problem if the metadata is cleared, on the display of the client PC 111. This message screen includes an OK button for selection in a case where there is no problem even when the metadata is cleared and a cancel button for selection in a case where there is a problem if the metadata is cleared.

In a step S1702, it is determined whether or not the OK button on the message screen displayed in the step S1701 has been clicked. If it is determined that the OK button has been clicked, i.e. if it is detected by the display controller 421 that the OK button has been clicked, the process proceeds to a step S1703. On the other hand, if it is determined that the OK button has not been clicked, i.e. if it is detected by the display controller 421 that the cancel button has been clicked, the present process is immediately terminated.

In the step S1703, the client PC 111 requests the MFP cooperation service 120 to discard the metadata set for the scanned business form selected by the user. In response to this request, the MFP cooperation service 120 deletes the metadata acquired from the cloud storage 130 as the transmission destination from the settings information of the scanned business form selected by the user.

Next, in a step S1704, the MFP cooperation service 120 transmits screen update information to the client PC 111. Upon receipt of this screen update information, the client PC 111 changes the screen shown in FIG. 12 displayed on the display as follows: First, the display of the metadata is deleted from the job properties area 704. Further, the display name of the button 710 is changed from "transmit" to "store". The setting display section 1201 and the edit button 1202 are eliminated, and the transmission destination-setting button 705 and the transmission destination folder-setting button 706 are displayed again. The screen is thus changed on the client PC 111, followed by terminating the present process.

With this, the user is enabled to change the cloud storage 130 as the transmission destination and the transmission destination folder again.

Figure 18:
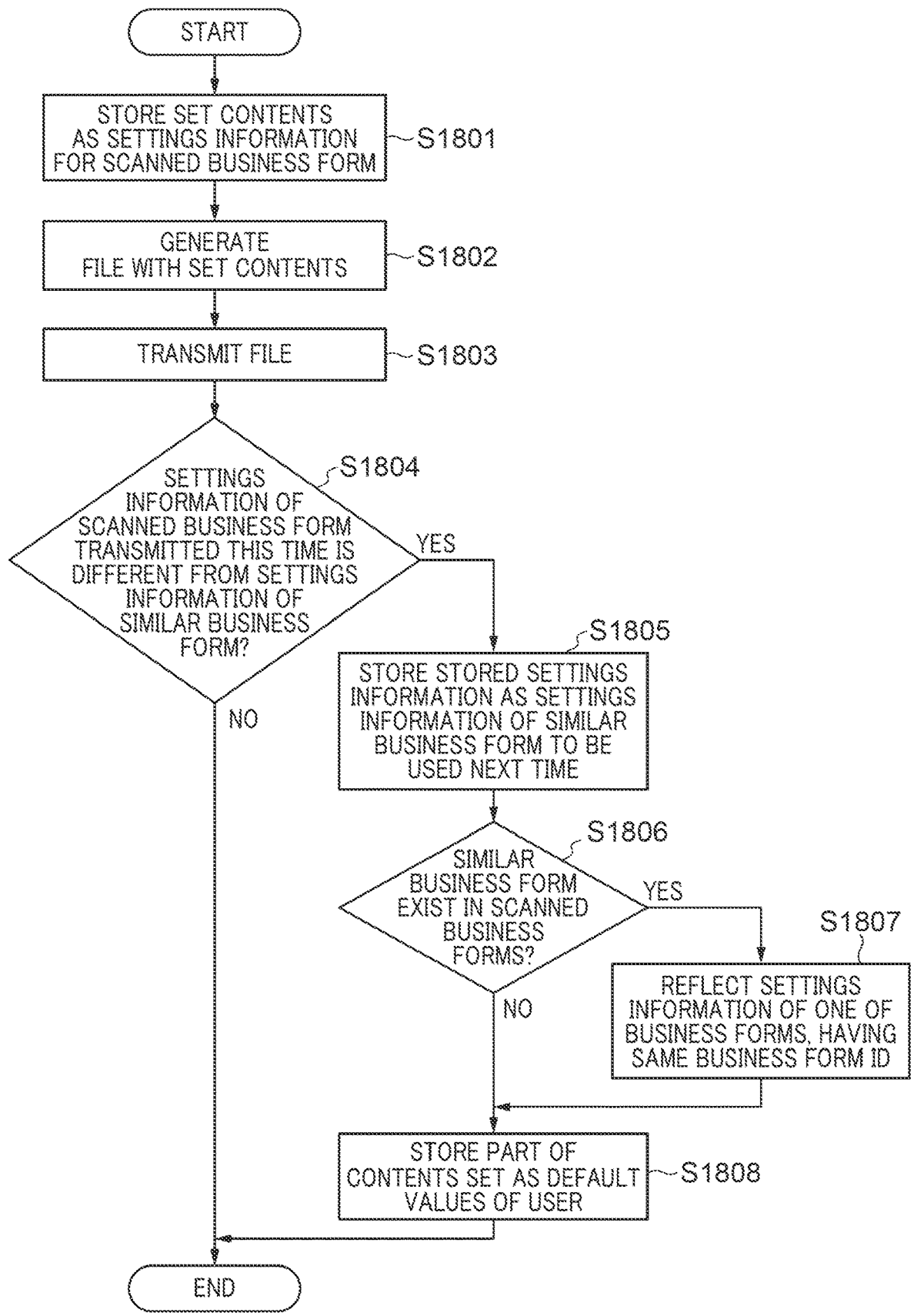
FIG. 18 is a flowchart of a process performed by the MFP cooperation service, for transmitting a scanned business form.

FIG. 18 is a flowchart of a process performed by the MFP cooperation service 120, for transmitting a scanned business form. The present process corresponds to the steps S541 to S545 in FIG. 5B. The processing steps are realized by the CPU 311 that loads a program stored in the ROM 312 or the HDD 314 of the MFP cooperation service 120 into the RAM 313 and executes the loaded program.

The present process is started when the button 710 being displayed as "transmit" on the scanned business form list screen is clicked after finally determining all settings information items with respect to a scanned business form selected by the user, whereby the client PC transmits a transmission request to the MFP cooperation service 120.

First, in a step S1801, upon receipt of this transmission request, the data management section 434 stores the settings information indicated in the job properties area 704 as the settings information of the scanned business form selected by the user. Note that this process is skipped unless data held by the MFP cooperation service 120 in the storing processing in the step S1601 is changed in the process in FIG. 16.

In a step S1802, the image processor 432 generates a file using the output setting and file name having been set.

In a step S1803, the cloud storage access section 433 transmits the file generated in the step S1802 to the set transmission destination folder in the cloud storage 130 as the set transmission destination. At this time, the settings of the metadata are transmitted at the same time if there are settings of the metadata. With this, the scanned business form selected by the user is stored in the cloud storage 130 as the transmission destination.

In a step S1804, the CPU 311 determines whether or not the settings information of the scanned business form transmitted this time is different from the settings information of a similar business form (i.e. information associated with the business form ID of the business form transmitted this time and stored in the settings information management table). That is, the CPU 311 determines whether or not the user has changed the default values of the settings information of the scanned business form transmitted this time on the client PC 111. If it is determined in the step S1804 that the settings information of the scanned business form transmitted this time is the same as the settings information of the similar business form (NO to the step S1804), the present process is terminated. On the other hand, if the settings information of the scanned business form transmitted this time is different from the settings information of the similar business form (YES to the step S1804), the process proceeds to a step S1805.

In the step S1805, the settings information of the scanned business form transmitted this time is stored as the settings information of a similar business form to be used next time, and the process proceeds to a step S1806. That is, the settings information management table shown in FIG. 19A is updated.

The steps S1806 to a step S1808 are the same as the steps S1605 to S1607 in FIG. 16, and hence description thereof is omitted.

As described above, in the first embodiment, when a file name is given to a newly scanned business form, the MFP cooperation service 120 performs the rule-based estimation process using the settings information management table shown in FIG. 19A as a look-up table (LUT). On the other hand, in a second embodiment, the MFP cooperation service 120 executes the estimation process using a learned model subjected to machine learning in an estimation section, not shown.

Note that the second embodiment has the same configuration as the first embodiment except that a learning section (learning unit) and the estimation section (estimation unit) are included in the MFP cooperation service 120, and hence the same components are denoted by the same reference numerals and redundant description is omitted. Although in the present embodiment, a case where the estimation section is also included in the MFP cooperation service 120 will be described, the estimation section may be included in the client PC 111.

In the present embodiment, the estimation process is performed as follows:

First, the MFP cooperation service 120 performs the similar business form determination with respect to a newly scanned business form and identifies the business form ID of the business form.

Next, the MFP cooperation service 120 acquires a file name rule associated with the identified form ID, stored in the column 1906 in the settings information management table shown in FIG. 19A.

Next, the necessity of the estimation process is checked. More specifically, if an item name is not included in the acquired file name rule, it is determined that the estimation process is not required, whereas if an item name is included, it is determined that the estimation process is required. As a result of this determination, if it is determined that the estimation process is not required, the present process is immediately terminated. On the other hand, if it is determined that the estimation process is required, the image of the newly scanned business form is input to a learning model associated with the identified form ID, included in the estimation section. With this, the location information of a character area indicating the contents of the item name included in the file name rule of a similar business form is output from the estimation section (acquisition unit) for the newly scanned business form. Then, the present process is terminated.

Note that the likelihood of the output location information of the character area is also output from the estimation section, and if the likelihood is lower than a predetermined value, the method described in the first embodiment may be executed.

The learned model associated with each form ID is a neural network, and its internal parameters are generated by machine learning of the learning model, performed by the learning section, not shown, of the MFP cooperation service 120.

This machine learning is performed as follows:

First, the MFP cooperation servicer 120 performs the similar business form determination with respect to a newly scanned business form and identifies the business form ID of this form.

Next, the MFP cooperation service 120 acquires the item names and the location information of the character areas, associated with the identified form ID, stored in the columns 1907a to 1907c, from the settings information management table (see FIG. 19A).

Then, the MFP cooperation service 120 (generation unit) generates data by associating the image of the newly scanned business form and the acquired item names and character areas (teacher data) with each other as the data for learning.

After that, the MFP cooperation service 120 performs learning processing of the learning model which is the neural network included in the learning section and associated with the identified form ID, using the generated data for learning. With this, the internal parameters of the learning model are updated.

Note that the learning section includes an error detection section and an updating section.

The error detection section determines an error between output data output from an output layer of the neural network according to input data input to an input layer, and the teacher data. The error detection section may calculate an error between the output data output from the neural network and the teacher data, using a loss function.

The updating section updates connection weighting coefficients and the like between nodes of the neural network based on errors determined by the error detection section such that the errors are reduced. This updating section updates the connection weighting coefficients and the like, using e.g. an error backward propagation method. The error backward propagation method is a method for adjusting connection weighting coefficients and the like between nodes of a neural network such that the above-mentioned errors are reduced.

Note that although in the present embodiment, a learning model subjected to machine learning by the learning section and a learned model used for the estimation process performed by the estimation section are models using an algorithm of a neural network, they may be learning models using any other algorithm. For example, they may be learning models using an algorithm of a decision tree or a support vector machine (SVM).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-204414, filed Dec. 9, 2020, which is hereby incorporated by reference herein in its entirety.

What is claimed is:

1. An information processing apparatus that sets, a file name of an image, comprising:
    at least one processor; and
    a memory that stores instructions, wherein the at least one processor executes the instructions to:
    display a preview image of a first image;
    detect a character area selected on the preview image by a user;
    extract an item name candidate area from a left side, an upper side, or a periphery of the selected character area; and
    display an item whose name is set based on a character string included in the extracted item name candidate area,
    wherein the displayed item is used for setting a file name rule, and
    wherein the set file name rule is stored and used for a file name of a second image similar to the first image.

2. The information processing apparatus according to claim 1, wherein in a case where the item name candidate area is not extracted, the at least one processor extracts a character rule which can be used for the name of the item from a character string included in the character area selected by the user, and sets the extracted character rule as the name of the item.

3. The information processing apparatus according to claim 2, wherein in a case where the extracted character rule is set as the item name of the item, the at least one processor causes temporarily set characters of information which cannot be identified only from the character rule to be included in the name, displays the item name such that the temporarily set characters can be edited by the user, and finally determines the item name of the item after the temporarily set characters are edited by the user.

4. The information processing apparatus according to claim 1,
    wherein the at least one processor, and
    wherein the cooperation service sets, based on the set file name rule, the file name of the second image.

5. The information processing apparatus according to claim 4,
    wherein the at least one processor displays, as a default value, the file name of the second image which is determined based on the set file name rule.

6. The information processing apparatus according to claim 5,
    wherein the at least one processor sets a character string included in the character area selected by the user as metadata of the first image.

7. The information processing apparatus according to claim 4, wherein the cooperation service further sets, in a case where no similar business form is found for the first image, information of a transmission destination and an output setting of the first image as a default value of settings information of the second image scanned next time and thereafter.

8. An image processing system that includes, an information processing apparatus and a cooperation service, and sets a file name of an image,
    wherein the information processing apparatus comprises:
    at least one processor; and
    a memory that stores instructions, wherein the at least one processor executes the instructions to:
    display a preview image of a first image; and
    detect a character area selected on the preview image by a user; and
    wherein the cooperation service comprises:
    at least one processor; and
    a memory that stores instructions, wherein the at least one processor executes the instructions to:
    extract an item name candidate area from a left side, an upper side, or a periphery of the selected character area; and
    cause display of an item whose name is set based on a character string included in the extracted item name candidate area, and
    wherein the displayed item is used for setting a file name rule, and
    wherein the set file name rule is stored and used for a file name of a second image similar to the first image.

9. A method of controlling an information processing apparatus that sets a file name of an image, comprising:
    displaying a preview image of a first image of the scanned original;
    detecting a character area selected on the preview image is selected by a user;
    extracting an item name candidate area from a left side, an upper side, or a periphery of the selected character area; and
    displaying an item whose name is set based on a character string included in the extracted item name candidate area,
    wherein the displayed item is used for setting a file name rule, and
    wherein the set file name rule is stored and used for a file name of a second image similar to the first image.

10. A non-transitory computer-readable storage medium storing a program for causing a computer to execute a method of controlling an information processing apparatus that sets a file name of an image,
wherein the method comprises:
displaying a preview image of a first image;
detecting a character area selected on the preview image by a user;
extracting an item name candidate area from a left side, an upper side, or a periphery of the selected character area; and
displaying an item whose name is set based on a character string included in the extracted item name candidate area,
wherein the displayed item is used for setting a file name rule, and
wherein the set file name rule is stored and used for a file name of a second image similar to the first image.

* * * * *